US012725075B2

(12) United States Patent
Hwang et al.

(10) Patent No.: US 12,725,075 B2
(45) Date of Patent: Sep. 1, 2026

(54) TRAINING DATA GENERATION VIA REINFORCEMENT LEARNING FAULT-INJECTION

(71) Applicant: International Business Machines Corporation, Armonk, NY (US)

(72) Inventors: Jinho Hwang, Dobbs Ferry, NY (US); Larisa Shwartz, Greenwich, CT (US); Jesus Maria Rios Aliaga, Philadelphia, PA (US); Frank Bagehorn, Dottikon (CH); Stephen James Hussey, Orange, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1113 days.

(21) Appl. No.: 17/482,068

(22) Filed: Sep. 22, 2021

(65) Prior Publication Data

US 2023/0087837 A1 Mar. 23, 2023

(51) Int. Cl.
*G06N 20/00* (2019.01)
*G06F 11/34* (2006.01)
*G06F 18/21* (2023.01)

(52) U.S. Cl.
CPC ......... *G06N 20/00* (2019.01); *G06F 11/3476* (2013.01); *G06F 18/217* (2023.01)

(58) Field of Classification Search
CPC .... G06N 20/00; G06F 18/217; G06F 11/3476
See application file for complete search history.

(56) References Cited

U.S. PATENT DOCUMENTS 7,225,200 B2 5/2007 Chickering et al.
10,986,013 B1 * 4/2021 Theimer ............ H04L 41/0604
(Continued)

FOREIGN PATENT DOCUMENTS

CN 109495297 A * 3/2019 .......... H04L 41/145
CN 110389892 A 10/2019
(Continued)

OTHER PUBLICATIONS

"Faults in Deep Reinforcement Learning Programs: A taxonomy and a Detection Approach", Nikanjam et al, Jan. 2, 2021 (Year: 2021).*
(Continued)

*Primary Examiner* — Haimei Jiang
(74) *Attorney, Agent, or Firm* — Amin, Turocy & Watson, LLP

(57) ABSTRACT

Systems/techniques for generating training data via reinforcement learning fault-injection are provided. A system can access a computing application. In various aspects, the system can train one or more machine learning models based on responses of the computing application to iterative fault-injections determined via reinforcement learning. More specifically, the system can: inject a first fault into the computing application; record a resultant dataset outputted by the computing application in response to the first fault; train the one or more machine learning models on the resultant dataset and the first fault; compute a reinforcement learning reward based on performance metrics of the one or more machine learning models and based on a quantity of the resultant dataset; update, via execution of a reinforcement learning algorithm, the fault-injection policy based on the reinforcement learning reward; and inject a second fault into the computing application, based on the updated fault-injection policy.

19 Claims, 14 Drawing Sheets

(56) References Cited

U.S. PATENT DOCUMENTS

| | | | | |
|---|---|---|---|---|
| 2017/0243140 | A1 | 8/2017 | Achin et al. | |
| 2019/0220745 | A1 | 7/2019 | Huang et al. | |
| 2019/0220776 | A1 | 7/2019 | Huang et al. | |
| 2019/0370473 | A1 | 12/2019 | Matrosov et al. | |
| 2019/0384699 | A1* | 12/2019 | Arbon | G06F 11/3698 |

FOREIGN PATENT DOCUMENTS

| | | | | | |
|---|---|---|---|---|---|
| CN | 110427275 | A | | 11/2019 | |
| CN | 111209131 | A | | 5/2020 | |
| CN | 111240304 | A | | 6/2020 | |
| CN | 111597122 | A | | 8/2020 | |
| CN | 112214922 | A | * | 1/2021 | G06F 30/27 |
| CN | 115934455 | A | | 4/2023 | |
| JP | 2021128538 | A | * | 9/2021 | |
| JP | 2023-046293 | A | | 4/2023 | |

OTHER PUBLICATIONS

"Exploring Fault Parameter Space Using Reinforcement Learning-based Fault Injection", Moradi et al , 2020.*

"Using Machine Learning Techniques to Evaluate Multicore Soft Error Reliability", Rocha De Rosa et al, 2019 (Year: 2019).*

Mell et al., "The NIST Definition of Cloud Computing," Recommendations of the National Institute of Standards and Technology, NIST Special Publication 800-145, Sep. 2011, 7 pages.

Japan Patent Office, "Notice of Reasons for Refusal" Jan. 20, 2026, 08 Pages, JP Application No. 2022-147140.

* cited by examiner

1400

TRAINING DATA GENERATION VIA REINFORCEMENT LEARNING FAULT-INJECTION

BACKGROUND

The subject disclosure relates to generation of training data, and more specifically to facilitating training data generation via reinforcement learning fault-injection.

When a computing application is newly deployed, one or more machine learning models are often implemented to monitor the computing application. The performance of such one or more machine learning models depends upon the amount and quality of historical data that is available for training. Unfortunately, because the computing application is newly deployed, there can be a dearth of historical data pertaining to and/or otherwise generated by the computing application, which can cause the one or more machine learning models to become sub-optimally trained. There exist some techniques that facilitate generation of synthetic training data. However, such existing techniques usually rely upon predetermined augmentation strategies for augmenting/modifying existing training data. Such predetermined augmentation strategies are very restrictive and cannot guarantee that the resulting augmented/modified training data represents realistic operational scenarios.

Accordingly, systems and/or techniques that can address one or more of the above-described technical problems can be desirable.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that can facilitate training data generation via reinforcement learning fault-injection are described.

According to one or more embodiments, a system is provided. The system can comprise a memory that can store computer-executable components. The system can further comprise a processor that can be operably coupled to the memory and that can execute the computer-executable components stored in the memory. In various embodiments, the computer-executable components can comprise a transceiver component that can access a computing application. In various aspects, the computer-executable components can further comprise a training component that can train one or more machine learning models based on responses of the computing application to iterative fault injections that are determined via reinforcement learning. More specifically, in various instances, the computer-executable components can comprise a fault-injection component that can inject a first fault into the computing application, based on a fault-injection policy. In various cases, the computer-executable components can further include a logging component that can record a resultant dataset that is outputted by the computing application in response to the first fault. In various aspects, the training component can train the one or more machine learning models on the resultant dataset and the first fault. In various instances, the computer-executable components can further comprise a reward component that can evaluate one or more performance metrics of the one or more machine learning models, evaluate a quantity of the resultant dataset, and compute a reinforcement learning reward based on the one or more performance metrics and the quantity. In various cases, the computer-executable components can further comprise an update component that can update, via execution of a reinforcement learning algorithm, the fault-injection policy based on the reinforcement learning reward. In various aspects, the fault-injection component can inject a second fault into the computing application, based on the updated fault-injection policy.

According to one or more embodiments, the above-described system can be implemented as a computer-implemented method and/or computer program product.

DETAILED DESCRIPTION

Figure 1:
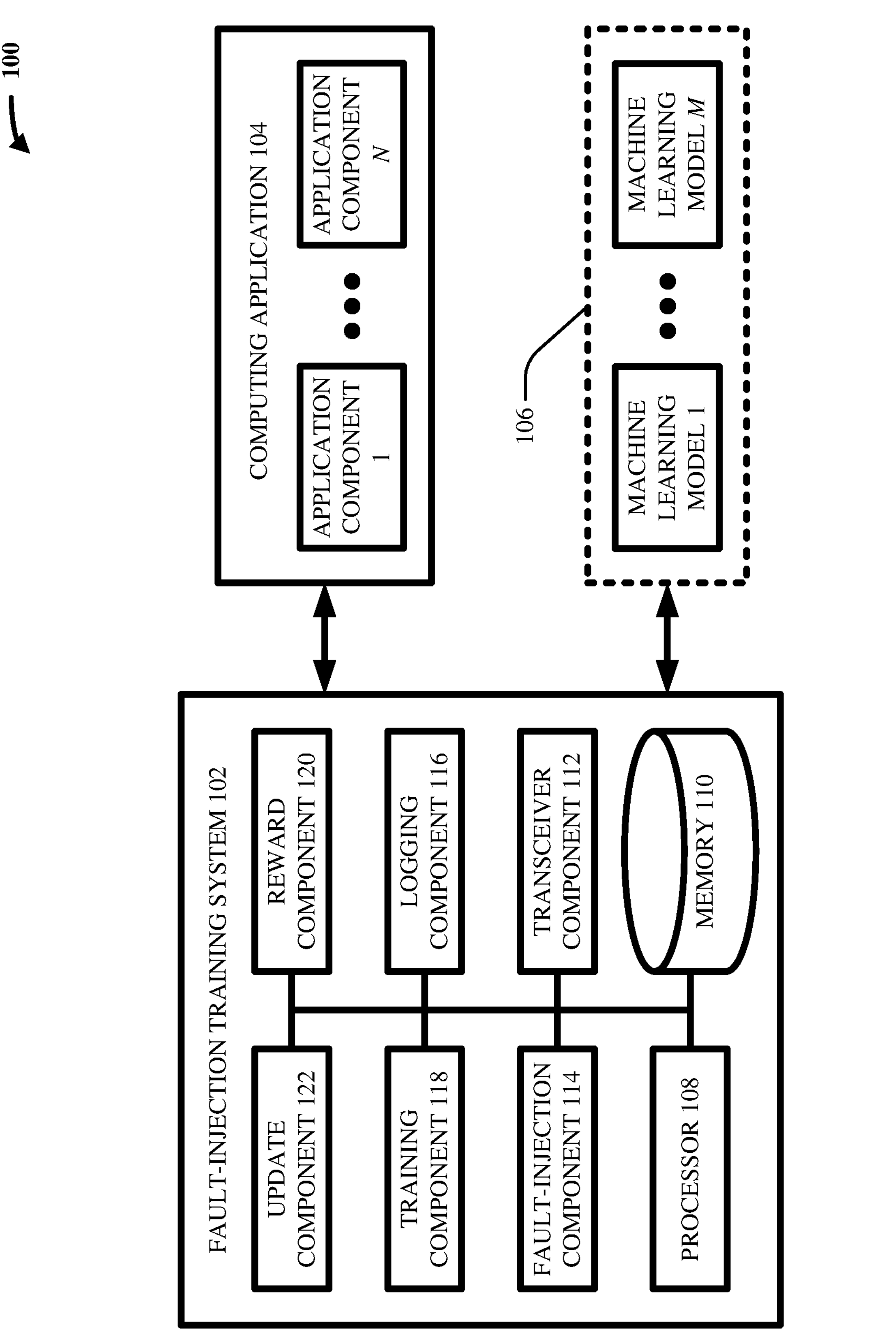
FIG. 1 illustrates a block diagram of an example, non-limiting system that facilitates training data generation via reinforcement learning fault-injection in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

When a computing application is newly deployed, or when an existing computing application is newly modernized from a monolithic architecture to a distributed architecture, one or more machine learning models can be implemented to monitor the computing application. For example, the computing application can be a containerized application that includes any suitable number of computing components (e.g., microservices, ingresses, deployments, pods, containers, Docker images) that make calls to and/or otherwise depend upon one another. In such case, the one or more machine learning models can be configured to receive data generated by such computing components and to infer and/or classify types of faults/errors (e.g., memory saturation, processing latency, unexpected content type) that are experienced and/or exhibited by such computing components.

The performance of such one or more machine learning models can depend upon the amount and/or quality of historical data that is available for training. Unfortunately, because the computing application is newly deployed and/or newly modernized, there can be a dearth of historical data pertaining to and/or otherwise generated by the computing application. In other words, the range of possible responses of the computing application to potential faults/errors might not be fully known a priori. Such lack of historical data can prevent the one or more machine learning models from becoming optimally trained.

To address this lack of historical training data, there exist some techniques that can facilitate generation of synthetic training data. However, such existing techniques usually rely upon predetermined augmentation strategies for augmenting/modifying existing training data. For example, copies of the existing training data can be augmented/modified by insertion of predetermined artefacts (e.g., different levels of noise can be inserted into different copies of the existing training data), and such augmented/modified copies can be considered as the synthetic training data. Unfortunately, such augmentation strategies are very restrictive (e.g., limited to the insertion of previously known artefacts into previously known training data). Moreover, such augmentation strategies cannot guarantee that the resulting synthetic training data represents realistic operational scenarios (e.g., the computing application might have little and/or no likelihood of encountering and/or producing certain artefacts when deployed in a real-world operational environment, and so training the one or more machine learning models to become unaffected by such artefacts can be unnecessary and/or irrelevant).

Systems and/or techniques that can address one or more of these technical problems can thus be desirable.

Various embodiments of the invention can address one or more of these technical problems. Specifically, various embodiments of the invention can provide systems and/or techniques that can facilitate training data generation via reinforcement learning fault-injection. More specifically, the inventors of various embodiments described herein recognized that, for one or more machine learning models that are configured to monitor a computing application, synthetic-yet-realistic training data can be generated by exposing the computing application to various fault scenarios (e.g., by simulating faults/errors). More specifically, for each fault scenario that it is exposed to, the computing application can output error data, and the one or more machine learning models can be trained on such error data. Since such error data is outputted by the computing application itself, such error data is guaranteed to be realistic (e.g., is guaranteed to be representative of data that the computing application might output during deployment in a real-world operational context). Moreover, the inventors further realized that, to ensure appropriate breadth of the error data (e.g., to ensure exploration of the range of possible faults that might be experienced/encountered by the computing application), the various fault scenarios can be chosen according to a reinforcement learning algorithm that iterates until any suitable threshold criteria are met. In other words, the inventors framed the above-described situation as a reinforcement learning problem, in which the internal parameters of the one or more machine learning models and/or the error data produced by the computing application can collectively be considered as reinforcement learning states, in which injection of faults into the computing application can be considered as reinforcement learning actions, and in which the size of the error data and/or the performance quality of the one or more machine learning models after being trained on the error data can collectively be considered as a reinforcement learning reward. In this way, the one or more machine learning models can be trained on error data, where such error data is generated by the computing application itself in response to iterative exposure to fault scenarios, and where such fault scenarios are chosen by a reinforcement learning algorithm.

Various embodiments described herein can be considered as a computerized tool for facilitating training data generation via reinforcement learning fault-injection. In various aspects, such a computerized tool can comprise a transceiver component, a fault-injection component, a logging component, a training component, a reward component, and/or an update component.

In various embodiments, there can be a computing application. In various aspects, the computing application can be any suitable combination of computer-executable hardware and/or computer-executable software. For instance, the computing application can be a distributed software program that includes one or more application components that can call and/or otherwise depend upon one or more other application components. In some cases, an application component can be any suitable microservice (e.g., a server and/or software module that can perform one or more discrete functionalities). In other cases, an application component can be any suitable containerized computing object, such as a Kubernetes® object. As those having ordinary skill in the art will appreciate, Kubernetes® objects can, as some non-limiting examples, include Kubernetes® ingresses, Kubernetes® services that are load-balanced by a Kubernetes® ingress, Kubernetes® deployments that are exposed by a Kubernetes® service, Kubernetes® pods that are managed by a Kubernetes® deployment, Kubernetes® containers that are executed by a Kubernetes® pod, Docker images that are implemented by a Kubernetes® container, and/or software packages that are specified by a Docker image.

In various embodiments, there can be a set of machine learning models that are configured to monitor the computing application. In various aspects, the set of machine learning models can include any suitable number of machine learning models. In various instances, each machine learning model in the set of machine learning models can exhibit any suitable artificial intelligence architecture (e.g., deep learning neural network, support vector machine, naïve Bayes model, decision tree model, linear and/or logistic regression model). Those having ordinary skill in the art will appreciate that different machine learning models in the set of machine learning models can exhibit the same and/or different artificial intelligence architectures as each other.

In various aspects, each of the set of machine learning models can be designed to monitor the computing application. That is, in various cases, each of the set of machine learning models can be configured to receive as input some amount of data that is generated by the computing application and to produce as output a classification and/or label that identifies a fault/error that is encountered and/or experienced by the computing application. In other words, each of the set of machine learning models can be a classifier that infers what is wrong with the computing application by analyzing data that is generated by the computing application.

In any case, it can be desired to train the set of machine learning models on error data that is outputted by the computing application. In various cases, the computerized tool can facilitate such functionality, as described herein.

In various embodiments, the transceiver component of the computerized tool can electronically access and/or otherwise electronically communicate with the computing application and/or with the set of machine learning models. In various aspects, the transceiver component can facilitate such electronic communication via any suitable wired and/or wireless electronic connections and/or via the transmission of any suitable electronic messages, instructions, and/or commands. In various instances, the computing application and/or the set of machine learning models (e.g., the coding scripts that define the computing application and/or that define the set of machine learning models) can be electronically stored in any suitable centralized and/or decentralized data structures, and the transceiver component can electronically retrieve and/or otherwise access the computing application and/or the set of machine learning models (e.g., can electronically retrieve and/or access the coding scripts that define the computing application and/or that define the set of machine learning models) by electronically communicating with such data structures. In any case, the transceiver component can electronically access the computing application and/or the set of machine learning models, such that other components of the computerized tool can electronically interact (e.g., read, edit, manipulate, execute) the computing application and/or the set of machine learning models (e.g., can electronically interact with the coding scripts that define the computing application and/or that define the set of machine learning models).

In various embodiments, the fault-injection component of the computerized tool can electronically store, maintain, control, and/or otherwise access a fault-injection policy. In various aspects, the fault-injection policy can be any suitable mapping that electronically correlates a set of application-and-model states to a set of injectable faults. In various instances, an application-and-model state can be any suitable information pertaining to the computing application and/or to the set of machine learning models. As some non-limiting examples, an application-and-model state can indicate: an amount, type, and/or content of error data that is generated by the computing application; can indicate values of variables (e.g., input variables, dummy variables, counter variables) that are initialized and/or manipulated by the computing application; can indicate a topology and/or dependency structure of the computing application; can indicate values of internal parameters (e.g., weight matrices, bias values) of the set of machine learning models; can indicate performance metrics (e.g., accuracy, precision, recall, area-under-curve, F1 score) of the set of machine learning models; and/or can indicate any suitable combination thereof.

In various aspects, an injectable fault can be any suitable information that indicates a particular electronic error that can be injected into the computing application, that indicates a particular location in the computing application (e.g., a particular microservice and/or component of the computing application) at which to inject the particular electronic error, and/or that indicates a particular time at which to inject the particular electronic error into the computing application. As some non-limiting examples, an injectable fault can be: a compile-time error, such as source code mutation (e.g., one or more lines of existing source code in a script can be changed), source code insertion (e.g., one or more lines of new source code can be added to a script), and/or source code deletion (e.g., one or more lines of existing source code in a script can be deleted/removed); a runtime error, such as corruption of memory space (e.g., use of uninitialized memory, use of non-owned memory, instigation of memory overflow), corruption of system calls (e.g., a system call sent from the computing application to an operating system kernel can be intercepted, the system call can be delayed, and/or the contents of the system call can be perturbed/modified), and/or corruption of network packets (e.g., a network packet sent from the computing application to any other computing device can be intercepted, the network packet can be delayed, and/or the contents of the network packet can be perturbed/modified); and/or any suitable combination thereof. As those having ordinary skill in the art will appreciate, two injectable faults that are of the same type (e.g., both are source code mutations, both are source code insertions, both are source code deletions, both are corruptions of memory space, both are corruptions of system calls, and/or both are corruptions of network packets) can nevertheless be considered as different, unique, and/or distinct if such two injectable faults occur at different times and/or at different locations in the computing application.

In any case, the fault-injection policy can map the set of application-and-model states to the set of injectable faults, such that the set of injectable faults respectively correspond to the set of application-and-model states. As those having ordinary skill in the art will appreciate, the fault-injection policy can be deterministic in some embodiments, and can be stochastic in other embodiments.

In various aspects, the fault-injection component can electronically identify a current state of the computing application and/or of the set of machine learning models (e.g., by electronically communicating with and/or querying the computing application and/or the set of machine learning models). In various instances, the fault-injection component can then search the fault-injection policy for the current state. In other words, the fault-injection component can locate the current state within the set of application-and-model states that are maintained in the fault-injection policy. In various cases, once the fault-injection component locates the current state within the set of application-and-model states, the fault-injection component can identify, within the set of injectable faults that are maintained in the fault-injection policy, a particular fault that corresponds to the current state. In various aspects, the fault-injection component can then electronically inject the particular fault into the computing application (e.g., the particular fault can specify a specific type of error to inject, a specific location in the computing application at which to inject the specific error, and/or a specific timing at which to inject the specific error).

In various embodiments, the logging component of the computerized tool can electronically record, capture, and/or otherwise store a resulting dataset that is outputted by the computing application in response to injection of the particular fault. As an example, if the fault-injection component injects the particular fault into a given microservice of the computing application, then the given microservice can output error data during compiling, execution, and/or runtime of the computing application. Moreover, any and/or all other microservices that are within the computing application and that are upstream of the given microservice (e.g., that depend directly and/or indirectly on the given microservice) can also output error data during compiling, execution, and/or runtime of the computing application. In various instances, the logging component can electronically record such error data, and such recorded error data can be considered as the resulting dataset that is outputted by the computing application in response to injection of the particular fault. In various cases, microservices that are within the computing application but that are not upstream of the given microservice (e.g., that do not depend directly or indirectly on the given microservice) can generate non-error data during execution/runtime of the computing application. In various aspects, the logging component can also record such non-error data, such that the recorded error data and the recorded non-error data can be collectively considered as the resulting dataset that is outputted by the computing application in response to injection of the particular fault.

In various embodiments, the training component of the computerized tool can electronically train the set of machine learning models on the resulting dataset and/or the particular fault.

More specifically, in various aspects, the training component can divide the resulting dataset into any suitable number of data subsets. In some instances, the number of data subsets can be equal to the number of machine learning models that are in the set of machine learning models (e.g., one data subset per machine learning model). For example, if the set of machine learning models includes m models, for any suitable positive integer m, then the training component can divide the resulting dataset into m data subsets. Indeed, in such case, a first machine learning model of the m machine learning models can be configured and/or structured to be able to receive as input a first data subset of the m data subsets, and an m-th machine learning model of the m machine learning models can be configured and/or structured to be able to receive as input an m-th data subset of the m data subsets. Those having ordinary skill in the art will appreciate that any two of the m data subsets can contain the same and/or different information as each other (e.g., can have the same and/or different data sizes as each other, and/or can contain overlapping and/or non-overlapping information). In any case, the union of all m of the data subsets can be equal to the resulting dataset itself. Note that, if the set of machine learning models includes only one model, then the training component can refrain from dividing the resulting dataset up at all. Instead, in such case, the one and only machine learning model can be configured and/or structured so as to be able to receive as input the entire resulting dataset.

In various instances, the training component can train the set of machine learning models in supervised fashion based on the data subsets and the particular fault. More specifically, as mentioned above, each of the set of machine learning models can be designed to monitor the computing application. That is, in some cases, each of the set of machine learning models can be configured to receive as input some amount of data that is generated by the computing application and to produce as output a classification and/or label that identifies a fault/error that is encountered by the computing application. Accordingly, each of the data subsets can be considered as a training input, and the particular fault can be considered as a ground-truth label and/or annotation that corresponds to such training input.

To illustrate, consider again the above example where there are m data subsets and m machine learning models. In various cases, the first machine learning model of the m machine learning models can have internal parameters (e.g., weight matrices, bias values) that are randomly initialized. In various instances, the training component can feed as input the first data subset of the m data subsets to the first machine learning model. In various cases, this can cause the first machine learning model to generate some output based on the first data subset. For instance, if the first machine learning model is a neural network, then the first data subset can be received by an input layer of the first machine learning model, the first data subset can complete a forward pass through one or more hidden layers of the first machine learning model, and an output layer of the first machine learning model can compute the output based on activations of the one or more hidden layers. In any case, the output produced by the first machine learning model can be considered as representing an inferred fault that the first machine learning model believes should correspond to the first data subset. In contrast, the particular fault can be the actual fault that was injected into the computing application by the fault-injection component, and so the particular fault can be considered as actually corresponding to the first data subset in ground-truth fashion. If the first machine learning model has so far undergone no and/or little training, the output can be very inaccurate (e.g., can be very different from the particular fault). In various aspects, the training component can compute a loss (e.g., cross-entropy) between the output and the particular fault, and the training component can then use such loss to update (e.g., via backpropagation) the internal parameters of the first machine learning model.

Similarly, in various cases, the m-th machine learning model of the m machine learning models can have internal parameters (e.g., weight matrices, bias values) that are randomly initialized. In various instances, the training component can feed as input the m-th data subset of the m data subsets to the m-th machine learning model. In various cases, this can cause the m-th machine learning model to generate some output based on the m-th data subset. As above, if the m-th machine learning model is a neural network, then the m-th data subset can be received by an input layer of the m-th machine learning model, the m-th data subset can complete a forward pass through one or more hidden layers of the m-th machine learning model, and an output layer of the m-th machine learning model can compute the output based on activations of the one or more hidden layers. In any case, the output produced by the m-th machine learning model can be considered as representing an inferred fault that the m-th machine learning model believes should correspond to the m-th data subset. In contrast, and as mentioned above, the particular fault can be considered as actually corresponding to the m-th data subset in ground-truth fashion. If the m-th machine learning model has so far undergone no and/or little training, the output can be very inaccurate (e.g., can be very different from the particular fault). In various aspects, the training component can compute a loss (e.g., cross-entropy) between the output and the particular fault, and the training component can then use such loss to update (e.g., via backpropagation) the internal parameters of the m-th machine learning model.

In this way, the training component can iteratively update internal parameters of the set of machine learning models, by treating the m data subsets as training inputs and by treating the particular fault as a ground-truth label for each of such training inputs.

In various embodiments, the reward component of the computerized tool can electronically compute a reinforcement learning reward, based on the resulting dataset and based on the set of machine learning models.

More specifically, in various aspects, the reward component can electronically evaluate any suitable performance metrics of the set of machine learning models after the training component has updated the internal parameters of the set of machine learning models. For instance, in some cases, the transceiver component can electronically access, from any suitable centralized and/or decentralized data structure, one or more validation datasets. In various aspects, the reward component can electronically execute the set of machine learning models on the one or more validation datasets. Based on such execution, the reward component can calculate performance metrics (e.g., accuracy, precision, recall, area-under-curve) of each of the set of machine learning models.

Furthermore, in various aspects, the reward component can electronically evaluate and/or quantify a size and/or quantity of the resulting dataset that is recorded by the logging component. In various instances, the size and/or quantity can be represented in any suitable units as desired. As some non-limiting examples, the size and/or quantity of the resulting dataset can be measured in bytes, in number of lines of code, in character count, and/or in any other suitable fashion.

Accordingly, in various aspects, the reward component can compute the reinforcement learning reward based on the performance metrics of the set of machine learning models and based on the size/quantity of the resulting dataset. As those having ordinary skill in the art will appreciate, the reinforcement learning reward can be equal to any suitable mathematical function and/or combination of mathematical functions (e.g., polynomials, linear combinations, exponentials, multiplicative coefficients) which take as arguments both the performance metrics of the set of machine learning models and the size/quantity of the resulting dataset. In various instances, the reinforcement learning reward can be mathematically defined so as to be greater when the performance metrics of the set of machine learning models are greater and/or when the size/quantity of the resulting dataset is greater, and to be lesser when the performance metrics of the set of machine learning models are lesser and/or when the size/quantity of the resulting dataset is lesser. Thus, the reinforcement learning reward can be maximized when the performance metrics and/or size/quantity are maximized, and the reinforcement learning reward can be minimized when the performance metrics and/or size/quantity are minimized.

In various embodiments, the update component of the computerized tool can electronically update the fault-injection policy, based on the reinforcement learning reward. More specifically, in various aspects, the update component can electronically store, maintain, control, and/or otherwise access a reinforcement learning algorithm. In various aspects, the reinforcement learning algorithm can be any suitable reinforcement learning technique that is configured to iteratively update a reinforcement learning policy based on a reinforcement learning reward. As some non-limiting examples, the reinforcement learning algorithm can be dynamic programming, Q-learning, deep Q-learning, and/or proximal policy optimization. In any case, the update component can electronically execute the reinforcement learning algorithm on the fault-injection policy and based on the reinforcement learning reward. As those having ordinary skill in the art will appreciate, such execution can cause the reinforcement learning algorithm to modify, update, and/or otherwise adjust the fault-injection policy (e.g., to modify, update, and/or otherwise adjust the mapping between the set of possible application-and-model states to the set of possible injectable faults).

After such modification, update, and/or adjustment, the fault-injection component, the logging component, the training component, the reward component, and/or the update component can repeat the above-described functionalities. That is, the fault-injection component can inject a new fault into the computing application, based on the updated fault-injection policy; the logging component can record a new resulting dataset that is produced by the computing application in response to injection of the new fault; the training component can update internal parameters of the set of machine learning models based on the new resulting dataset and the new fault; the reward component can compute a new reinforcement learning reward based on new performance metrics of the set of machine learning models and/or based on a size/quantity of the new resulting dataset; and the update component can again update the fault-injection policy based on the new reinforcement learning reward.

In various aspects, this procedure can iterate for any suitable number of times (e.g., until the update component determines that the reinforcement learning reward has satisfied any suitable threshold). Over such iterations, repeated execution of the reinforcement learning algorithm can cause the fault-injection policy to become iteratively and/or incrementally optimized for increasing the reinforcement learning reward. In other words, and as those having ordinary skill in the art will appreciate, each change/update made to the fault-injection policy by the reinforcement learning algorithm can have the purpose and/or effect of increasing the value of the reinforcement learning reward in the next iteration. As mentioned above, the reinforcement learning reward can be mathematically defined as a function of the performance metrics of the set of machine learning models, such that the magnitude of the reinforcement learning reward rises with the magnitudes of the performance metrics. Accordingly, maximizing the reinforcement learning reward can cause the performance metrics of the set of machine learning models to commensurately become maximized.

In some embodiments, the computerized tool can further comprise an execution component. In various aspects, the execution component can electronically deploy and/or execute the computing application and/or the set of machine learning models, after the performance metrics of the set of machine learning models have been maximized as described above.

Therefore, various embodiments described herein include a computerized tool that can iteratively inject faults into a computing application, which faults can be determined by a reinforcement learning algorithm, and that can train a set of machine learning models on data that is generated by the computing application in response to such injected faults. In other words, the inventors of various embodiments described herein established a reinforcement learning framework, in which: data pertaining to and/or produced by the computing application and/or otherwise pertaining to the set of machine learning models can be considered as reinforcement learning states; in which different computing faults that can be injected at different times and/or into different locations of the computing application can be considered as reinforcement learning actions; and in which performance metrics of the set of machine learning models and a size of data that is generated by the computing application in response to injected faults can be considered as reinforcement learning rewards. Accordingly, by executing a reinforcement learning algorithm (e.g., dynamic programming, Q-learning, proximal policy optimization) in such a reinforcement learning framework, the reinforcement learning reward can become optimized, and such optimization, due to the definition of the reinforcement learning reward, can necessarily cause the set of machine learning models to become optimally trained.

Various embodiments of the invention can be employed to use hardware and/or software to solve problems that are highly technical in nature (e.g., to facilitate training data generation via reinforcement learning fault-injection), that are not abstract and that cannot be performed as a set of mental acts by a human. Further, some of the processes performed can be performed by a specialized computer (e.g., reinforcement learning algorithm, such as dynamic programming, Q-learning, deep Q-learning, and/or proximal policy optimization). In various aspects, some defined tasks associated with various embodiments of the invention can include: accessing, by a device operatively coupled to a processor, a computing application; and training, by the device, one or more machine learning models based on responses of the computing application to iterative fault-injections that are determined via reinforcement learning.

Neither the human mind nor a human with pen and paper can electronically access a computing application, electronically inject a fault (e.g., memory saturation, transmission latency, code mutations) into the computing application based on a fault-injection policy, electronically record a resultant dataset that is outputted by the computing application in response to the injected fault, electronically train (e.g., via backpropagation) one or more machine learning models on the resultant dataset, electronically compute a reinforcement learning reward based on performance metrics of the one or more machine learning models, and/or electronically execute a reinforcement learning algorithm based on the computed reinforcement learning reward so as to update the fault-injection policy. Indeed, machine learning models and reinforcement learning algorithms are specific combinations of computer-executable hardware and computer-executable software that cannot be executed and/or trained in any sensible, practical, and/or reasonable way outside of a computing environment.

In various instances, one or more embodiments described herein can be integrated into a practical application. Indeed, as described herein, various embodiments of the invention, which can take the form of systems and/or computer-implemented methods, can be considered as a computerized tool that can electronically inject faults into a computing application and that can electronically train machine learning models on data that is outputted by the computing application in response to the injected faults. As mentioned above, for one or more machine learning models that are configured to monitor a computing application, the performance of such one or more machine learning models is governed by the amount and/or quality of training data that is available to train the one or more machine learning models. When the computing application is newly deployed and/or newly created, there can be a dearth of such training data. Accordingly, synthetic training data should be generated. As mentioned above, existing techniques for generating synthetic training data rely upon predetermined augmentation strategies (e.g., inserting noise into existing training data), which renders such existing techniques unable to guarantee that any resulting synthetic training data is realistic. In stark contrast, the computerized tool described herein can iteratively inject faults into the computing application, and the resulting data that is produced by the computing application in response to such faults can be considered as synthetic training data. Because the synthetic training data is produced by the computing application itself, it is guaranteed to be realistic (e.g., to be representative of data that is actually outputted and/or encountered by the computing application). Moreover, to ensure that the space of possible synthetic training data is appropriately explored, the computerized tool can implement a fault-injection policy to select which faults to inject into the computing application, and the computerized tool can execute a reinforcement learning algorithm (e.g., dynamic programming, Q-learning) to iteratively optimize the fault-injection policy. Thus, the computerized tool described herein can help to ensure that one or more machine learning models that are configured to monitor a computing application are properly trained (e.g., achieve a threshold level of performance efficacy), which is certainly a useful and practical application of computers.

It should be appreciated that the figures and the herein disclosure describe non-limiting examples of various embodiments of the invention.

FIG. 1 illustrates a block diagram of an example, non-limiting system 100 that can facilitate training data generation via reinforcement learning fault-injection in accordance with one or more embodiments described herein. As shown, a fault-injection training system 102 can be electronically integrated, via any suitable wired and/or wireless electronic connections, with a computing application 104 and/or with a set of machine learning models 106.

In various embodiments, the computing application 104 can be any suitable combination of computer-executable hardware and/or computer-executable software that performs one or more computerized functionalities. That is, the computing application 104 can be any suitable computerized program and/or computerized software as desired. In various aspects, as shown, the computing application 104 can include n application components, for any suitable positive integer n: an application component 1 to an application component n. In various instances, the application component 1 can be any suitable combination of computer-executable hardware and/or computer-executable software that performs one or more discrete sub-functionalities of the computing application 104. For example, the application component 1 can be a microservice of the computing application 104. As another example, the application component 1 can be a containerized object of the computing application 104, such as: a Kubernetes® ingress, a Kubernetes® service that is load-balanced by a Kubernetes® ingress, a Kubernetes® deployment that is exposed by a Kubernetes® service, a Kubernetes® pod that is managed by a Kubernetes® deployment, a Kubernetes® container that is executed by a Kubernetes® pod, and/or a Docker image that is implemented by a Kubernetes® container. Similarly, the application component n can be any suitable combination of computer-executable hardware and/or computer-executable software that performs one or more discrete sub-functionalities of the computing application 104 (e.g., the application component n can be a microservice and/or a containerized computing object).

Accordingly, the computing application 104 can, in various cases, be considered as a distributed application, in which the application component 1 to the application component n collectively constitute the computing application 104. Such a distributed architecture is shown in FIG. 2.

Figure 2:
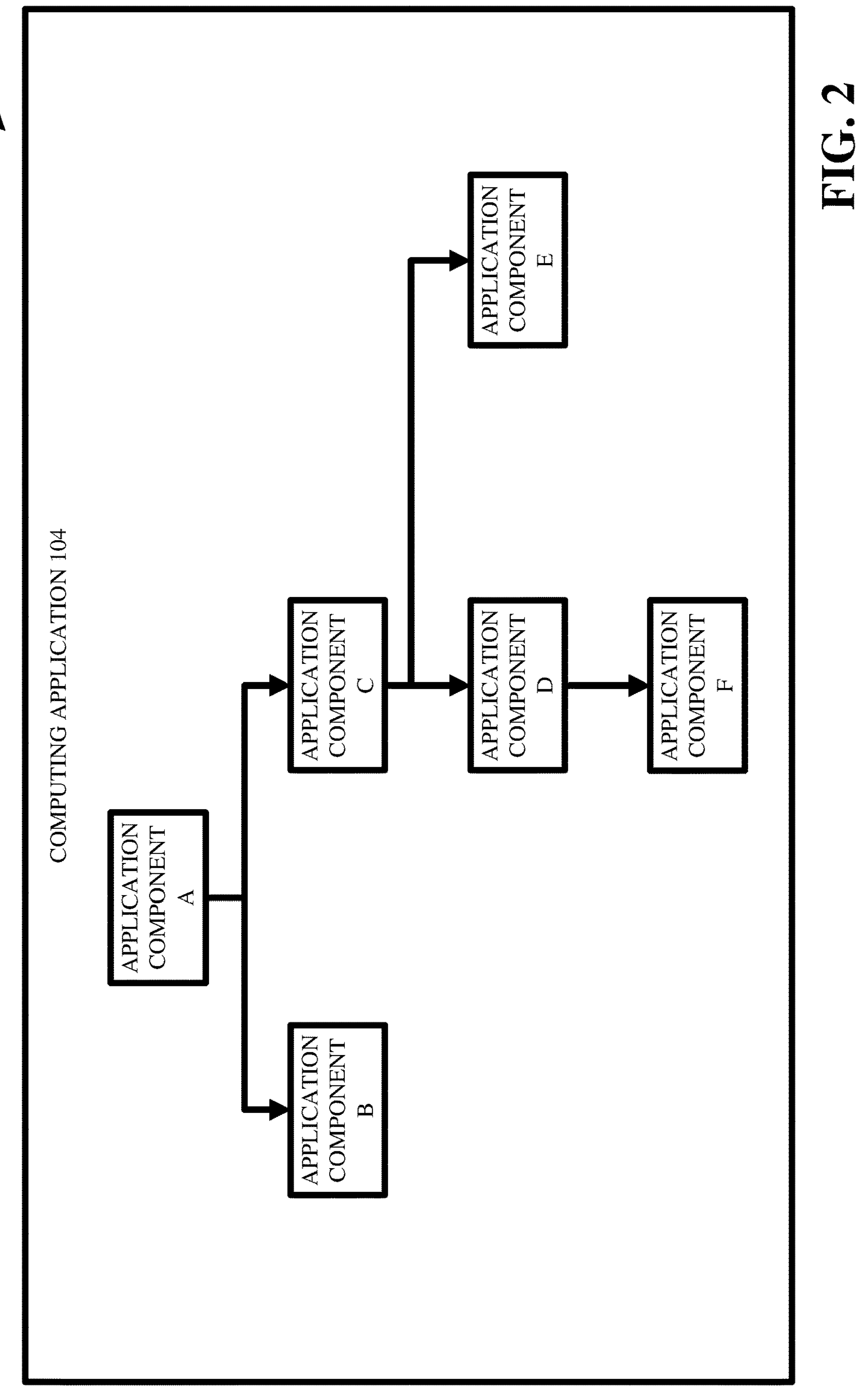
FIG. 2 illustrates a block diagram of an example, non-limiting computing application in accordance with one or more embodiments described herein.

FIG. 2 illustrates a block diagram 200 of an example, non-limiting computing application in accordance with one or more embodiments described herein. In other words, FIG. 2 shows a non-limiting example embodiment of the distributed structure of the computing application 104.

As shown in this non-limiting example and for purposes of illustration, the computing application 104 can include six application components: an application component A, an application component B, an application component C, an application component D, an application component E, and an application component F. In various aspects, compilation and/or execution of the computing application 104 can cause the application component A to be called (e.g., to be executed and/or downloaded). In order to facilitate its own functionality, the application component A can call on (e.g., can execute and/or download) the application component B and the application component C, as shown. In other words, the application component A can be considered as depending upon the application component B and the application component C (e.g., the application components B and C can be downstream of the application component A; and/or the application component A can be upstream of the application components B and C). In similar fashion, the application component C can facilitate its own functionality by calling on (e.g., by executing and/or downloading) the application component D and the application component E. That is, the application component C can be considered as depending upon the application component D and the application component E (e.g., the application components D and E can be downstream of the application component C; and/or the application component C can be upstream of the application components D and E). Since the application component A depends upon the application component C, and since the application component C depends upon both the application components D and E, the application component A can be considered as depending indirectly upon both the application components D and E. Lastly, as shown in this non-limiting example, the application component D can facilitate its own functionality by calling on (e.g., by executing and/or downloading) the application component F. Accordingly, this means that the application component D can be considered as depending upon the application component F (e.g., the application component F can be downstream of the application component D; and/or the application component D can be upstream of the application component F). Furthermore, this means that the application component C and the application component A both depend indirectly on the application component F.

Those having ordinary skill in the art will appreciate that FIG. 2 shows a mere non-limiting example of how the distributed architecture of the computing application 104 might look.

Referring back to FIG. 1, in various embodiments, the set of machine learning models 106 can include m machine learning models, for any suitable positive integer m: a machine learning model 1 to a machine learning model m. In various aspects, the machine learning model 1 can exhibit any suitable artificial intelligence architecture. As a non-limiting example, the machine learning model 1 can be a neural network. In such case, the machine learning model 1 can include any suitable number of neural network layers (e.g., an input layer, one or more hidden layers, an output layer), can include any suitable numbers of neurons in various layers (e.g., different layers can have the same and/or different numbers of neurons as each other), can include any suitable activation functions in various neurons (e.g., softmax, sigmoid, hyperbolic tangent, rectified linear unit), and/or can include any suitable interneuron connections (e.g., forward connections, skip connections, recurrent connections). In other cases, the machine learning model 1 can exhibit any other suitable artificial intelligence architecture, such as support vector machine, XGBoost, naïve Bayes, random forest, linear regression, and/or logistic regression.

Similarly, in various aspects, the machine learning model m can exhibit any suitable artificial intelligence architecture. For instance, the machine learning model m can be a neural network. In such case, the machine learning model m can include any suitable number of neural network layers, can include any suitable numbers of neurons in various layers, can include any suitable activation functions in various neurons, and/or can include any suitable interneuron connections. In other cases, the machine learning model m can exhibit any other suitable artificial intelligence architecture, such as support vector machine, XGBoost, naïve Bayes, random forest, linear regression, and/or logistic regression.

Those having ordinary skill in the art will appreciate that any of the set of machine learning models 106 can exhibit the same and/or different artificial intelligence architectures as each other.

In any case, each of the set of machine learning models 106 can be configured and/or designed to monitor the computing application 104. For example, the machine learning model 1 can be configured to receive as input given data that is generated by the computing application 104 (e.g., that is generated by a given subset of the n application components of the computing application 104), and the machine learning model 1 can be configured to produce as output a classification that indicates a fault and/or error that afflicts the computing application 104 (e.g., that afflicts the given subset of the n application components of the computing application 104). Likewise, the machine learning model m can be configured to receive as input different data that is generated by the computing application 104 (e.g., that is generated by a different subset of the n application components of the computing application 104), and the machine learning model m can be configured to produce as output a classification that indicates a fault and/or error that afflicts the computing application 104 (e.g., that afflicts the different subset of the n application components of the computing application 104).

In various aspects, the computing application 104 can be newly developed and/or newly created, meaning that there can be a dearth of historical data produced by the computing application 104. Such dearth of historical data can prevent the set of machine learning models 106 from becoming sufficiently trained. In various cases, the fault-injection training system 102 can be considered as a computerized tool that can address this technical problem, as described below.

In various embodiments, the fault-injection training system 102 can comprise a processor 108 (e.g., computer processing unit, microprocessor) and a computer-readable memory 110 that is operably connected to the processor 108. The memory 110 can store computer-executable instructions which, upon execution by the processor 108, can cause the processor 108 and/or other components of the fault-injection training system 102 (e.g., transceiver component 112, fault-injection component 114, logging component 116, training component 118, reward component 120, and/or update component 122) to perform one or more acts. In various embodiments, the memory 110 can store computer-executable components (e.g., transceiver component 112, fault-injection component 114, logging component 116, training component 118, reward component 120, and/or update component 122), and the processor 108 can execute the computer-executable components.

In various embodiments, the fault-injection training system 102 can comprise a transceiver component 112. In various aspects, the transceiver component 112 can electronically access, electronically receive, and/or otherwise electronically communicate with the computing application 104 and/or with the set of machine learning models 106. For example, in some instances, one or more coding scripts that define the computing application 104 and/or that define the set of machine learning models 106 can be electronically stored and/or maintained in any suitable centralized and/or decentralized data structures (not shown), and the transceiver component 112 can electronically retrieve such one or more coding scripts from such data structures. As another example, the computing application 104 and/or the set of machine learning models 106 can be hosted by any suitable computing devices (not shown), and the transceiver component 112 can access the computing application 104 and/or the set of machine learning models 106 by electronically communicating with such computing devices. In any case, the transceiver component 112 can electronically access and/or obtain the computing application 104 and/or the set of machine learning models 106, such that other components of the fault-injection training system 102 can electronically interact with the computing application 104 and/or with the set of machine learning models 106.

In various embodiments, the fault-injection training system 102 can comprise a fault-injection component 114. In various aspects, the fault-injection component 114 can electronically store, maintain, and/or otherwise access a fault-injection policy. In various instances, the fault-injection policy can be a mapping between a set of application/model states and a set of computing faults. In various cases, the fault-injection component 114 can identify a current state of the computing application 104 and/or of the set of machine learning models 106. Accordingly, the fault-injection component 114 can leverage the fault-injection policy to identify a computing fault that corresponds to the current state, and the fault-injection component 114 can electronically inject the identified computing fault into the computing application 104.

In various embodiments, the fault-injection training system 102 can comprise a logging component 116. In various aspects, the logging component 116 can electronically record and/or otherwise electronically capture a resultant dataset that is generated by the computing application 104 in response to injection of the identified computing fault. In other words, upon being exposed/subjected to the identified computing fault, the computing application 104 can generate various error data as a response to the identified computing fault, the logging component 116 can record and/or otherwise log such error data, and such recorded/logged error data can be considered as the resultant dataset.

In various embodiments, the fault-injection training system 102 can comprise a training component 118. In various aspects, the training component 118 can electronically train each of the set of machine learning models 106 on the resultant dataset and the identified computing fault. More specifically, the training component 118 can divide the resultant dataset up into m data subsets, where any of such m data subsets can be overlapping and/or non-overlapping with each other. Accordingly, such m data subsets can be considered as respectively corresponding to the set of machine learning models 106. That is, the machine learning model 1 can be configured to receive as input a first data subset, and the machine learning model m can be configured to receive as input an m-th data subset. In various instances, for each of the set of machine learning models 106, a respectively corresponding one of the m data subsets can be considered as a training input, and the identified computing fault can be considered as a ground-truth label and/or annotation that corresponds to that training input. Accordingly, based on such training inputs and ground-truth labels/annotations, the training component 118 can update (e.g., via backpropagation) the internal parameters of each of the set of machine learning models 106.

In various embodiments, the fault-injection training system 102 can comprise a reward component 120. In various aspects, the reward component 120 can electronically compute a reinforcement learning reward, after the set of machine learning models 106 have been trained by the training component 118. More specifically, once the set of machine learning models 106 have been trained by the training component 118, the reward component 120 can evaluate performance metrics of the set of machine learning models 106. For example, the transceiver component 112 can electronically access any suitable validation datasets (not shown), the reward component 120 can execute each of the set of machine learning models 106 on such validation datasets, and the reward component 120 can accordingly calculate performance metrics (e.g., accuracy levels, precision levels, and/or recall levels) of each of the set of machine learning models 106. Furthermore, in various cases, the reward component 120 can electronically evaluate a quantity of the resultant dataset that is logged/recorded by the logging component 116. For example, the reward component 120 can estimate a number of bytes (e.g., megabytes and/or gigabytes) of the resultant dataset. In any case, once the reward component 120 has evaluated the performance metrics of the set of machine learning models 106 and the quantity of the resultant dataset, the reward component 120 can compute/calculate the reinforcement learning reward based on the performance metrics and the quantity. As those having ordinary skill in the art will understand, the reinforcement learning reward can be equal to any suitable mathematical function and/or combination of mathematical functions, which take as arguments the performance metrics and the quantity. In various cases, the reinforcement learning reward can be mathematically defined so that its magnitude increases with that the performance metrics and the quantity.

In various embodiments, the fault-injection training system 102 can comprise an update component 122. In various aspects, the update component 122 can electronically execute a reinforcement learning algorithm (e.g., dynamic programming, Q-learning) on the fault-injection policy, based on the reinforcement learning reward. As those having ordinary skill in the art will appreciate, such execution can cause the reinforcement learning algorithm to update and/or otherwise modify the fault-injection policy, with the effect and/or goal of increasing the reinforcement learning reward in subsequent iterations. Once the fault-injection policy is updated/modified, the above-described procedures/functions can be repeated. That is, the fault-injection component 114 can inject a new fault into the computing application, which new fault is determined by the updated fault-injection policy; the logging component 116 can record a new resultant dataset that is produced by the computing application 104 in response to the new fault; the training component 118 can train the set of machine learning models 106 on the new resultant dataset and the new fault; the reward component 120 can compute a new reinforcement learning reward based on new performance metrics of the set of machine learning models 106 and based on a quantity of the new resultant dataset; and the update component 122 can again update the fault-injection policy based on the new reinforcement learning reward. As these iterations progress, they can cause the reinforcement learning reward computed by the reward component 120 to become maximized, which can correspondingly cause the performance metrics of the set of machine learning models 106 to become maximized.

Figure 3:
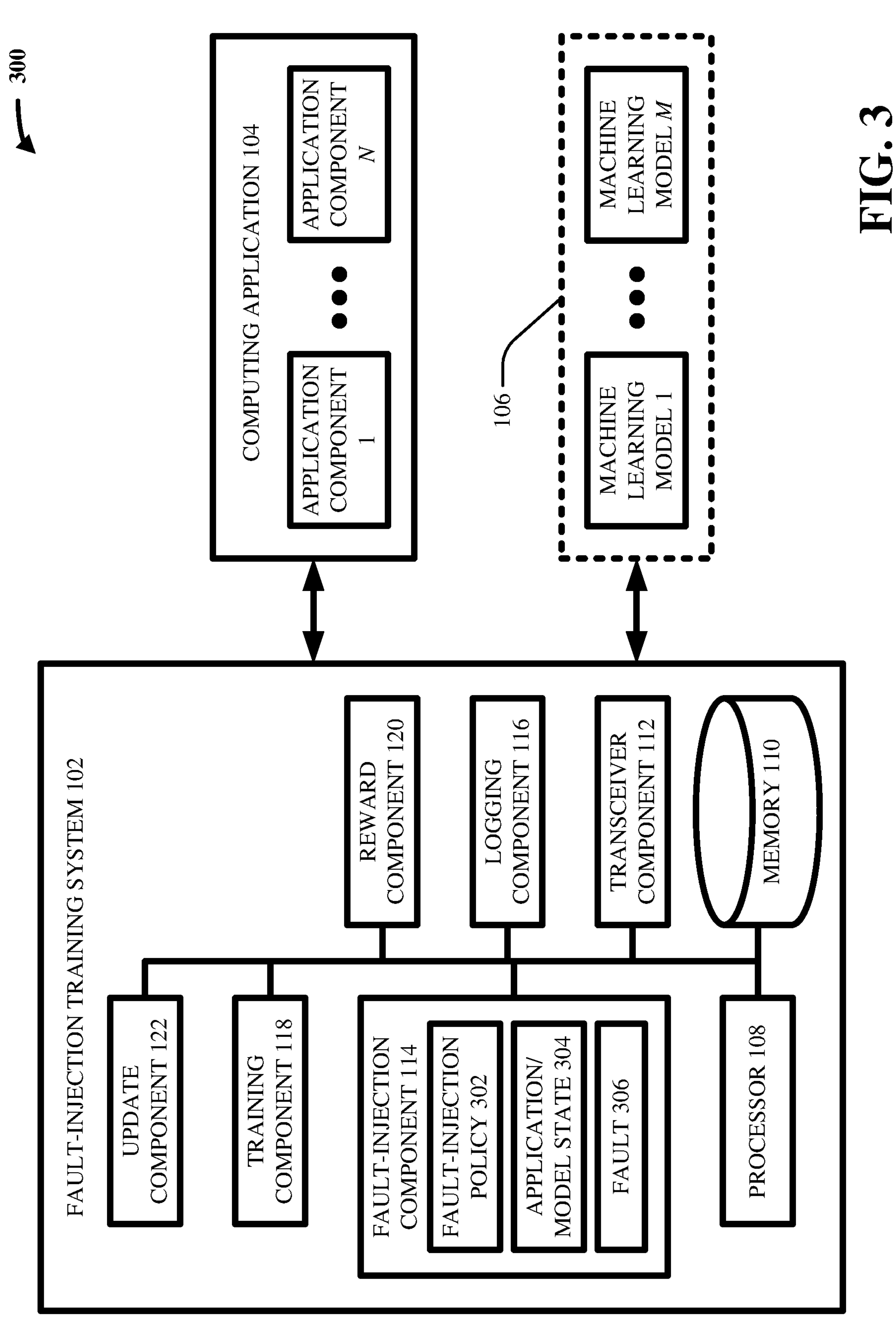
FIG. 3 illustrates a block diagram of an example, non-limiting system including a fault-injection policy that facilitates training data generation via reinforcement learning fault-injection in accordance with one or more embodiments described herein.

FIG. 3 illustrates a block diagram of an example, non-limiting system 300 including a fault-injection policy that can facilitate training data generation via reinforcement learning fault-injection in accordance with one or more embodiments described herein. As shown, the system 300 can, in some cases, comprise the same components as the system 100, and can further comprise a fault-injection policy 302, an application/model state 304, and/or a fault 306.

In various aspects, the fault-injection component 114 can electronically store, electronically maintain, and/or otherwise electronically access the fault-injection policy 302. In various instances, the fault-injection policy 302 can be any suitable mapping of application/model states to injectable faults.

In various cases, an application/model state can be any suitable data and/or information that pertains to the computing application 104 and/or to the set of machine learning models 106. For example, an application/model state can indicate a topological and/or distributed structure of the computing application 104 (e.g., can indicate which specific application components are included in the computing application 104, and/or can indicate how such specific application components depend upon one another in the computing application 104). As another example, an application/model state can indicate an amount, type, and/or content of data that is generated by the computing application 104 (e.g., can indicate what specific data has been outputted by what specific application components in the computing application 104). As still another example, an application/model state can indicate values of internal parameters of the set of machine learning models 106 (e.g., can indicate the specific weight matrices and/or bias values that are implemented in each of the set of machine learning models 106). As yet another example, an application/model state can indicate performance metrics of the set of machine learning models 106 (e.g., can indicate the specific levels of accuracy, precision, and/or recall of each of the set of machine learning models 106). In various cases, an application/model state can indicate any suitable combination of any of the aforementioned.

In various aspects, an injectable fault can be any suitable computing error that can be injected, at any suitable time, into any suitable location (e.g., any suitable application component) of the computing application 104. For example, an injectable fault can be a compile-time error, such as a source code mutation, insertion, and/or deletion that is applied to the source code of any given application component of the computing application 104 prior to execution of the computing application 104. As another example, an injectable fault can be a runtime error, such as a memory corruption, a system call corruption, and/or a network packet corruption that is applied to any given application component of the computing application 104 during execution of the computing application 104. In various cases, an injectable fault can include any suitable combination of any of the aforementioned.

As those having ordinary skill in the art will appreciate, the fault-injection policy 302 can have any suitable format and/or structure as desired. For example, in some cases, the fault-injection policy 302 can be formatted and/or structured as a look-up table that links application/model states to corresponding injectable faults. As another example, in other cases, the fault-injection policy 302 can be a mathematical function that takes as an argument an application/model state and that outputs a corresponding injectable fault. Moreover, in some instances, the fault-injection policy 302 can be deterministic in nature. In other instances, the fault-injection policy 302 can be stochastic and/or probabilistic in nature. In any case, those having ordinary skill in the art will appreciate that the fault-injection policy 302 can be any suitable reinforcement learning policy that maps reinforcement learning states to reinforcement learning actions, where the application/model states can be considered as the reinforcement learning states, and where the injectable faults can be considered as the reinforcement learning actions.

In various aspects, the fault-injection component 114 can electronically communicate with and/or otherwise query the computing application 104 and/or the set of machine learning models 106, so as to identify a current state of the computing application 104 and/or of the set of machine learning models 106. In various instances, such current state can be referred to as the application/model state 304. In other words, the application/model state 304 can indicate any suitable data that defines the state of the computing application 104 and/or of the set of machine learning models 106 at a current time.

In various cases, based on the application/model state 304, the fault-injection component 114 can leverage the fault-injection policy 302, so as to identify the fault 306. That is, the fault-injection component 114 can use the fault-injection policy 302 to identify which injectable fault corresponds to the application/model state 304, and such identified injectable fault can be referred to as the fault 306. In other words, the fault 306 can be considered as the fault that is to be injected into the computing application 104, based on the current state of the computing application 104 and/or on the current state of the set of machine learning models 106 (e.g., based on the application/model state 304). This is further explained with respect to FIG. 4.

Figure 4:
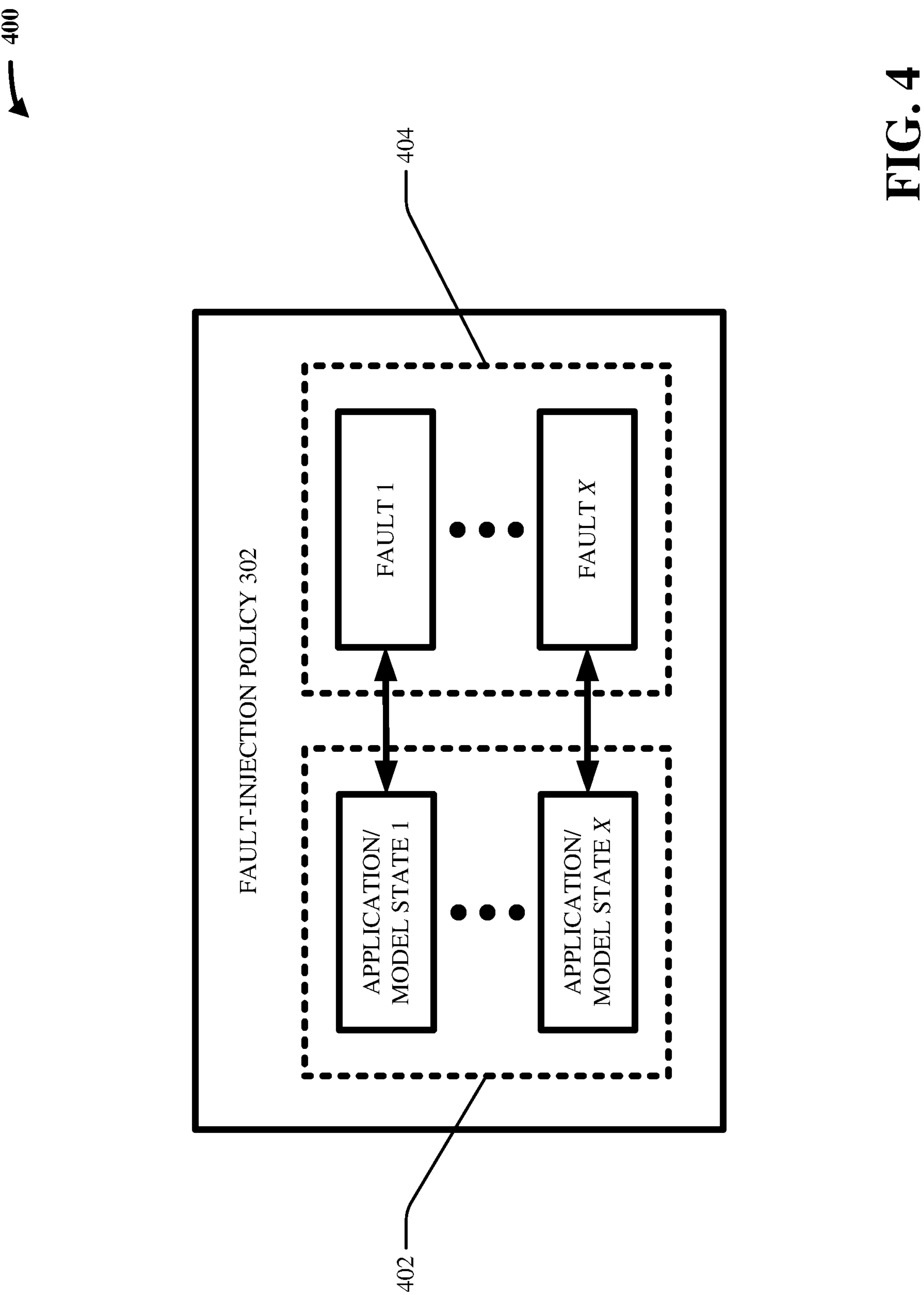
FIG. 4 illustrates a block diagram of an example, non-limiting fault-injection policy in accordance with one or more embodiments described herein.

FIG. 4 illustrates a block diagram 400 of an example, non-limiting fault-injection policy in accordance with one or more embodiments described herein. That is, FIG. 4 illustrates a non-limiting example embodiment of the fault-injection policy 302.

As shown, the fault-injection policy 302 can map and/or correlate a set of application/model states 402 to a set of injectable faults 404. In various instances, as shown, the set of application/model states 402 can include x states, for any suitable positive integer x: an application/model state 1 to an application/model state x. Moreover, as shown, the set of injectable faults 404 can include x faults: a fault 1 to a fault x. In other words, the set of application/model states 402 can respectively correspond to the set of injectable faults 404. For instance, the application/model state 1 can correspond to the fault 1. In various cases, this can mean that, when the current state of the computing application 104 and/or of the set of machine learning models 106 matches the application/model state 1, the fault 1 is the injectable fault that should be injected into the computing application 104. Similarly, the application/model state x can correspond to the fault x. Again, this can mean that, when the current state of the computing application 104 and/or of the set of machine learning models 106 matches the application/model state x, the fault x is the injectable fault that should be injected into the computing application 104.

As those having ordinary skill in the art will appreciate, the set of application/model states 402 can be considered as representing the space of all possible states of the computing application 104 and/or of the set of machine learning models 106. Likewise, as those having ordinary skill in the art will further appreciate, the set of injectable faults 404 can be considered as representing the space of all possible electronic faults (e.g., type of fault, timing of fault, and/or location of fault) that can be injected into the computing application 104.

In various aspects, as mentioned above, the fault-injection component 114 an identify the application/model state 304 by communicating with and/or otherwise querying the computing application 104 and/or by communicating with and/or otherwise querying the set of machine learning models 106. In various instances, the fault-injection component 114 can then electronically locate the application/model state 304 within the set of application/model states 402. In various cases, the fault-injection component 114 can accordingly locate, within the set of injectable faults 404, the specific fault that corresponds to the application/model state 304. That specific fault can be referred to as the fault 306.

As those having ordinary skill in the art will appreciate, in various instances, the fault-injection component 114 can electronically inject the fault 306 into the computing application 104. In other words, the fault-injection component 114 can apply the fault 306 to the computing application 104, can implement the fault 306 in the computing application 104, and/or can otherwise subject the computing application 104 to the fault 306. In still other words, the fault 306 can specify a particular computing error (e.g., code insertion, code mutation, code deletion, memory corruption, software call corruption, network packet corruption), can specify a particular application component which is to be the target of the particular computing error, and can specify a particular time at which to inject the particular computing error into the particular application component, and the fault-injection component 114 can accordingly inject the particular computing error into the particular application component at the particular time.

Figure 5:
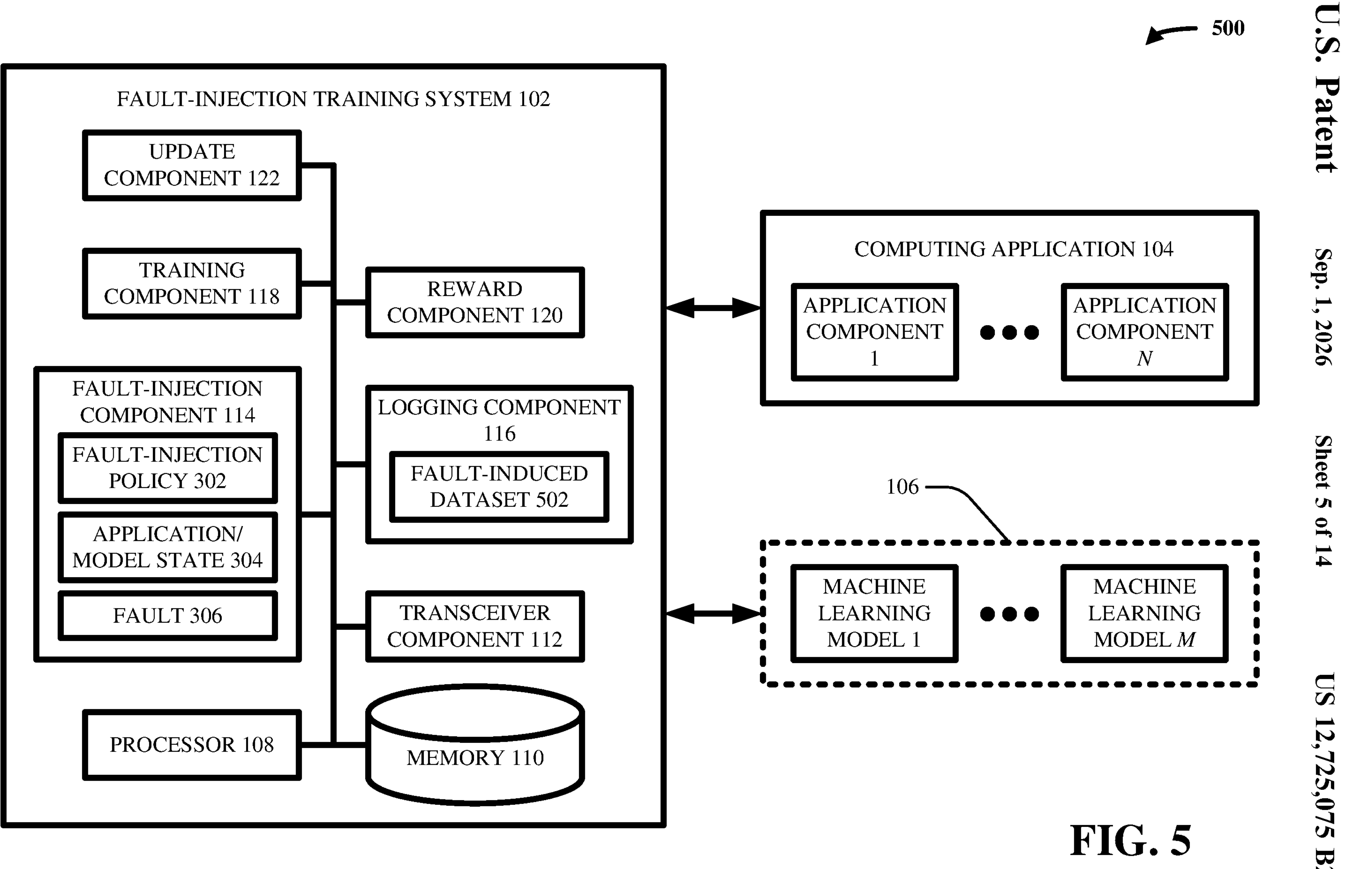
FIG. 5 illustrates a block diagram of an example, non-limiting system including a fault-induced dataset that facilitates training data generation via reinforcement learning fault-injection in accordance with one or more embodiments described herein.

FIG. 5 illustrates a block diagram of an example, non-limiting system 500 including a fault-induced dataset that can facilitate training data generation via reinforcement learning fault-injection in accordance with one or more embodiments described herein. As shown, the system 500 can, in some cases, comprise the same components as the system 300, and can further comprise a fault-induced dataset 502.

In various aspects, in response to injection of the fault 306, the computing application 104 can generate, produce, and/or otherwise output various errors. In some instances, the logging component 116 can electronically record and/or otherwise electronically capture such errors, and such recorded/captured errors can be referred to as the fault-induced dataset 502. This is further explained with respect to FIG. 6.

Figure 6:
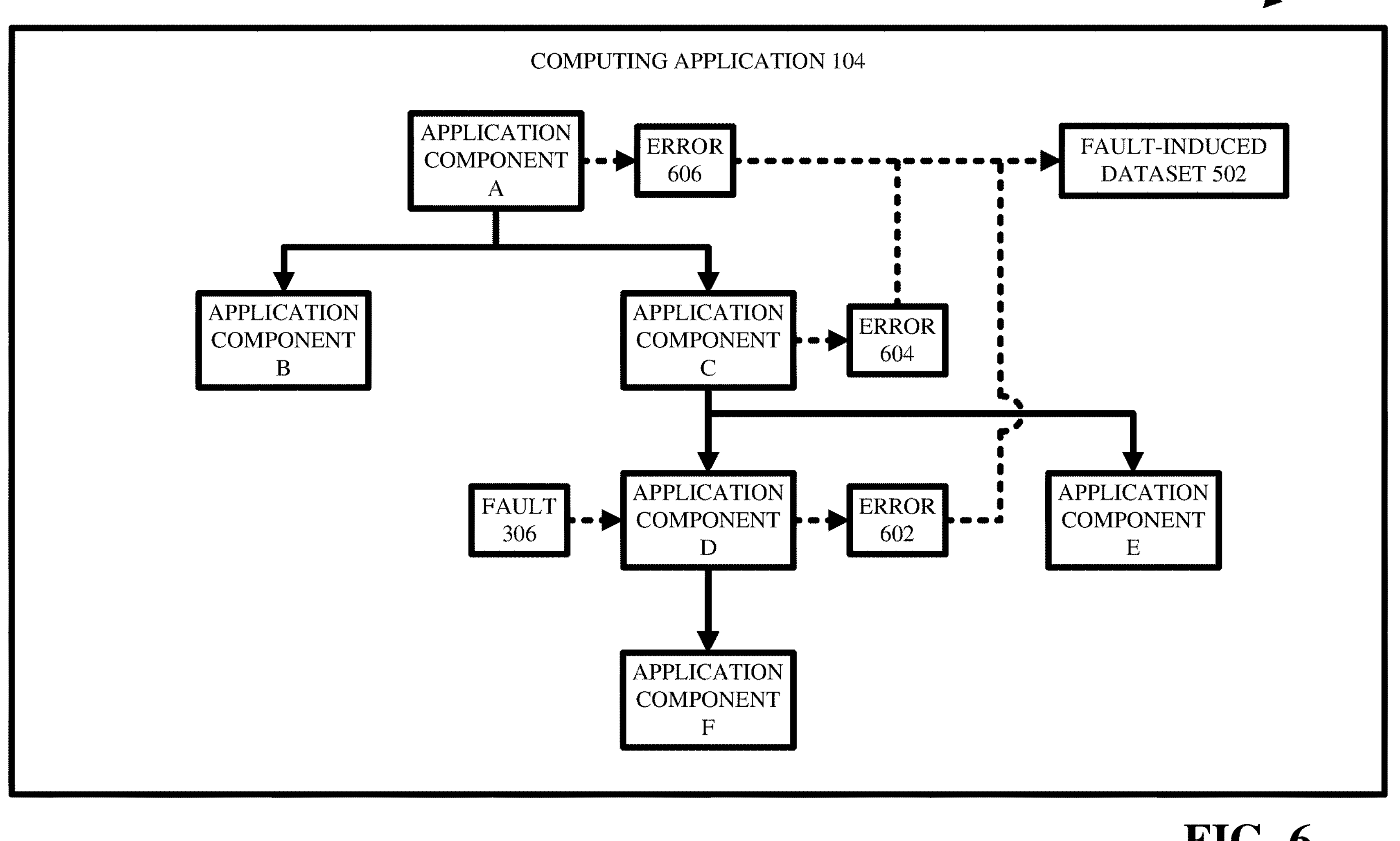
FIG. 6 illustrates a block diagram of an example, non-limiting fault-induced dataset in accordance with one or more embodiments described herein.

FIG. 6 illustrates a block diagram 600 of an example, non-limiting fault-induced dataset in accordance with one or more embodiments described herein. More specifically, FIG. 6 shows how the fault 306 can be injected into the computing application 104, so as to produce the fault-induced dataset 502.

As mentioned above, in some non-limiting examples, the computing application 104 can comprise the application components A to F that depend upon and/or otherwise call on one another in distributed fashion. In this non-limiting example, suppose that the fault 306 specifies that it is to be injected into the application component D (e.g., the fault 306 can be a code insertion/mutation/deletion that is to be applied to the coding script that defines the application component D; the fault 306 can be a corruption of memory space utilized by the application component D; the fault 306 can be a corruption of one or more system calls made by the application component D; and/or the fault 306 can be a corruption of one or more network packets transmitted by and/or retrieved by the application component D). Accordingly, as shown, the fault-injection component 114 can inject the fault 306 into the application component D. In various cases, during compilation and/or execution of the computing application 104, injection of the fault 306 can cause the application component D to output an error 602. In various aspects, the error 602 can be one or more scalars, one or more vectors, one or more matrices, one or more tensors, one or more character strings, and/or any suitable combination thereof which indicate and/or otherwise correspond to erroneous functioning of the application component D.

In various aspects, since the application component C can be upstream of and/or otherwise dependent upon the application component D, and since the fault 306 can prevent the application component D from functioning properly, the application component C can also be prevented from functioning properly due to the fault 306. Accordingly, the application component C can output an error 604. In various aspects, the error 604 can be one or more scalars, one or more vectors, one or more matrices, one or more tensors, one or more character strings, and/or any suitable combination thereof which indicate and/or otherwise correspond to erroneous functioning of the application component C.

Furthermore, since the application component A can be upstream of and/or otherwise dependent upon the application component C, and since the fault 306 can prevent the application component C from functioning properly, the application component A can also be prevented from functioning properly due to the fault 306. Accordingly, the application component A can output an error 606. In various aspects, the error 606 can be one or more scalars, one or more vectors, one or more matrices, one or more tensors, one or more character strings, and/or any suitable combination thereof which indicate and/or otherwise correspond to erroneous functioning of the application component A.

In various cases, the logging component 116 can electronically record the error 602, the error 604, and the error 606. Accordingly, as shown, the error 602, the error 604, and the error 606 can collectively be considered as the fault-induced dataset 502.

Although not explicitly shown in FIG. 6, those having ordinary skill in the art will appreciate that, in this non-limiting example, application components that are not dependent upon the application component D (e.g., such as the application component B, the application component E, and the application component F) can refrain from outputting errors in response to injection of the fault 306 into the application component D. Instead, such other application components can output non-erroneous data (not shown), which can be one or more scalars, one or more vectors, one or more matrices, one or more tensors, one or more character strings, and/or any suitable combination thereof that indicate and/or otherwise correspond to proper functioning of such other application components. In various cases, the logging component 116 can electronically record such non-erroneous data, and such non-erroneous data can be considered to be included in the fault-induced dataset 502.

As those having ordinary skill in the art will appreciate, the logging component 116 can store/capture the fault-induced dataset 502, so that the fault-induced dataset 502 reflects the topological structure of the computing application 104. For example, in some cases, the computing application 104 can be configured to output structured data, in which case it can be trivial to know which application component outputted which specific erroneous and/or non-erroneous data. However, in other cases, the computing application 104 can be configured to output unstructured data. In such cases, the logging component 116 can implement any suitable entity-extraction and/or entity resolution technique so as to identify which application component outputted which specific erroneous and/or non-erroneous data. As some non-limiting examples, such entity-extraction/resolution techniques can include rule-based entity extraction/resolution (e.g., using prior knowledge of the topology of the computing application 104 to extract entities), query-language-based entity extraction/resolution (e.g., building a dictionary to match entities to outputted data), language-model-based entity extraction/resolution (e.g., probabilistic entity extraction using a trained language model), and/or topology traversal entity extraction/resolution (e.g., a tree representing distributed architecture of the computing application 104 can be built and traversed node-by-node to assign each piece of recorded data to a corresponding application component).

In various aspects, once the logging component 116 has recorded/captured the fault-induced dataset 502, the training component 118 can electronically train the set of machine learning models 106 based on the fault-induced dataset 502. In other words, the fault-induced dataset 502 can be considered as training data for the set of machine learning models 106. This is further explained with respect to FIG. 7.

Figure 7:
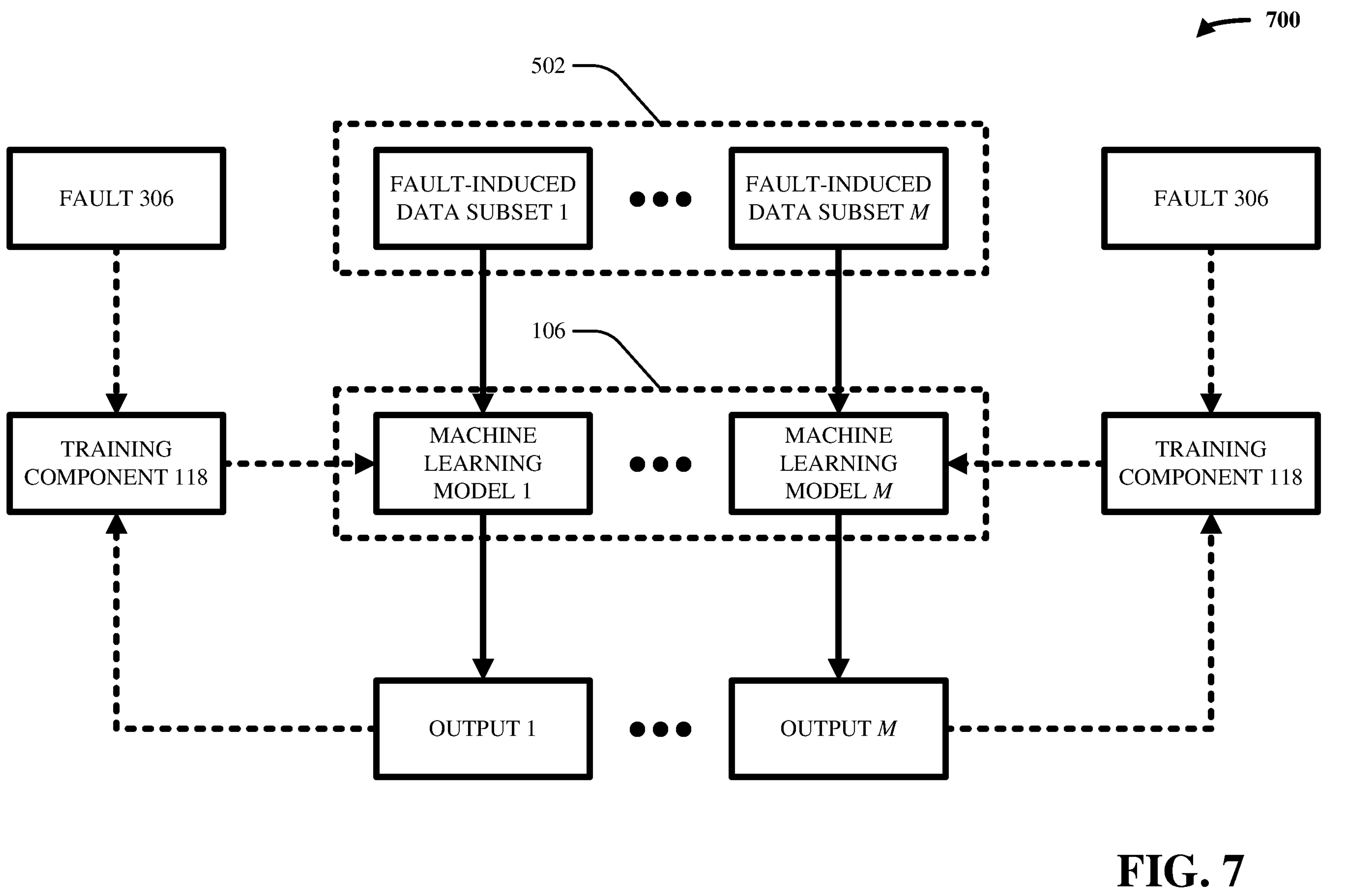
FIG. 7 illustrates an example, non-limiting block diagram showing how a set of machine learning models can be trained based on a fault-induced dataset in accordance with one or more embodiments described herein.

FIG. 7 illustrates an example, non-limiting block diagram 700 showing how the set of machine learning models 106 can be trained based on the fault-induced dataset 502 in accordance with one or more embodiments described herein.

In various embodiments, as shown, the training component 118 can electronically divide the fault-induced dataset 502 into m fault-induced data subsets: a fault-induced data subset 1 to a fault-induced data subset m. In other words, there can be one respectively corresponding fault-induced data subset for each of the set of machine learning models 106. In some cases, each of the m fault-induced data subsets can be disjoint with each other (e.g., in some cases, none of the m fault-induced data subsets can have overlapping and/or shared information). In other cases, any of the m fault-induced data subsets can be non-disjoint with each other (e.g., in other cases, any of the m fault-induced data subsets can have overlapping and/or shared information). Moreover, as those having ordinary skill in the art will appreciate, any of the m fault-induced data subsets can be of the same and/or different sizes as each other. In any case, the union of the m fault-induced data subsets can be equal to the fault-induced dataset 502. Furthermore, as shown, the m fault-induced data subsets can respectively correspond to the set of machine learning models 106. That is, the machine learning model 1 can be configured and/or otherwise designed to receive as input the fault-induced data subset 1, and the machine learning model m can be configured and/or otherwise designed to receive as input the fault-induced data subset m.

In various aspects, the training component 118 can electronically train, in supervised fashion, the machine learning model 1 based on the fault-induced data subset 1 and the fault 306. More specifically, the internal parameters (e.g., weight matrices, bias values) of the machine learning model 1 can be initialized in any suitable fashion (e.g., randomly initialized). In various instances, the training component 118 can electronically feed the fault-induced data subset 1 to the machine learning model 1, which can cause the machine learning model 1 to generate an output 1. For example, if the machine learning model 1 is a neural network, then: an input layer of the machine learning model 1 can receive the fault-induced data subset 1; the fault-induced data subset 1 can complete a forward pass through one or more hidden layers of the machine learning model 1; and an output layer of the machine learning model 1 can compute the output 1 based on activations provided by the one or more hidden layers. In any case, the output 1 can be considered as representing the computing fault that the machine learning model 1 believes and/or infers should correspond to the fault-induced data subset 1. In contrast, since the fault-induced data subset 1 was created in response to the fault 306, the fault 306 can be considered as the actual computing fault that corresponds to the fault-induced dataset 1. In other words, the fault 306 can be considered as a ground-truth annotation that corresponds to the fault-induced data subset 1. In any case, the training component 118 can compute a loss (e.g., cross-entropy) between the output 1 and the fault 306 (e.g., between embedded vector representations of the output 1 and the fault 306), and the training component 118 can update (e.g., via backpropagation) the internal parameters of the machine learning model 1 based on such loss.

Similarly, in various aspects, the training component 118 can electronically train, in supervised fashion, the machine learning model m based on the fault-induced data subset m and the fault 306. More specifically, the internal parameters (e.g., weight matrices, bias values) of the machine learning model m can be initialized in any suitable fashion (e.g., randomly initialized). In various instances, the training component 118 can electronically feed the fault-induced data subset m to the machine learning model m, which can cause the machine learning model m to generate an output m. For example, if the machine learning model m is a neural network, then: an input layer of the machine learning model m can receive the fault-induced data subset m; the fault-induced data subset m can complete a forward pass through one or more hidden layers of the machine learning model m; and an output layer of the machine learning model m can compute the output m based on activations provided by the one or more hidden layers. In any case, the output m can be considered as representing the computing fault that the machine learning model m believes and/or infers should correspond to the fault-induced data subset m. In contrast, since the fault-induced data subset m was created in response to the fault 306, the fault 306 can be considered as the actual computing fault that corresponds to the fault-induced dataset m. In other words, the fault 306 can be considered as a ground-truth annotation that corresponds to the fault-induced data subset m. In any case, the training component 118 can compute a loss (e.g., cross-entropy) between the output m and the fault 306 (e.g., between embedded vector representations of the output m and the fault 306), and the training component 118 can update (e.g., via backpropagation) the internal parameters of the machine learning model m based on such loss.

In this way, the training component 118 can update and/or train each of the set of machine learning models 106, based on the fault-induced dataset 502 and the fault 306.

Figure 8:
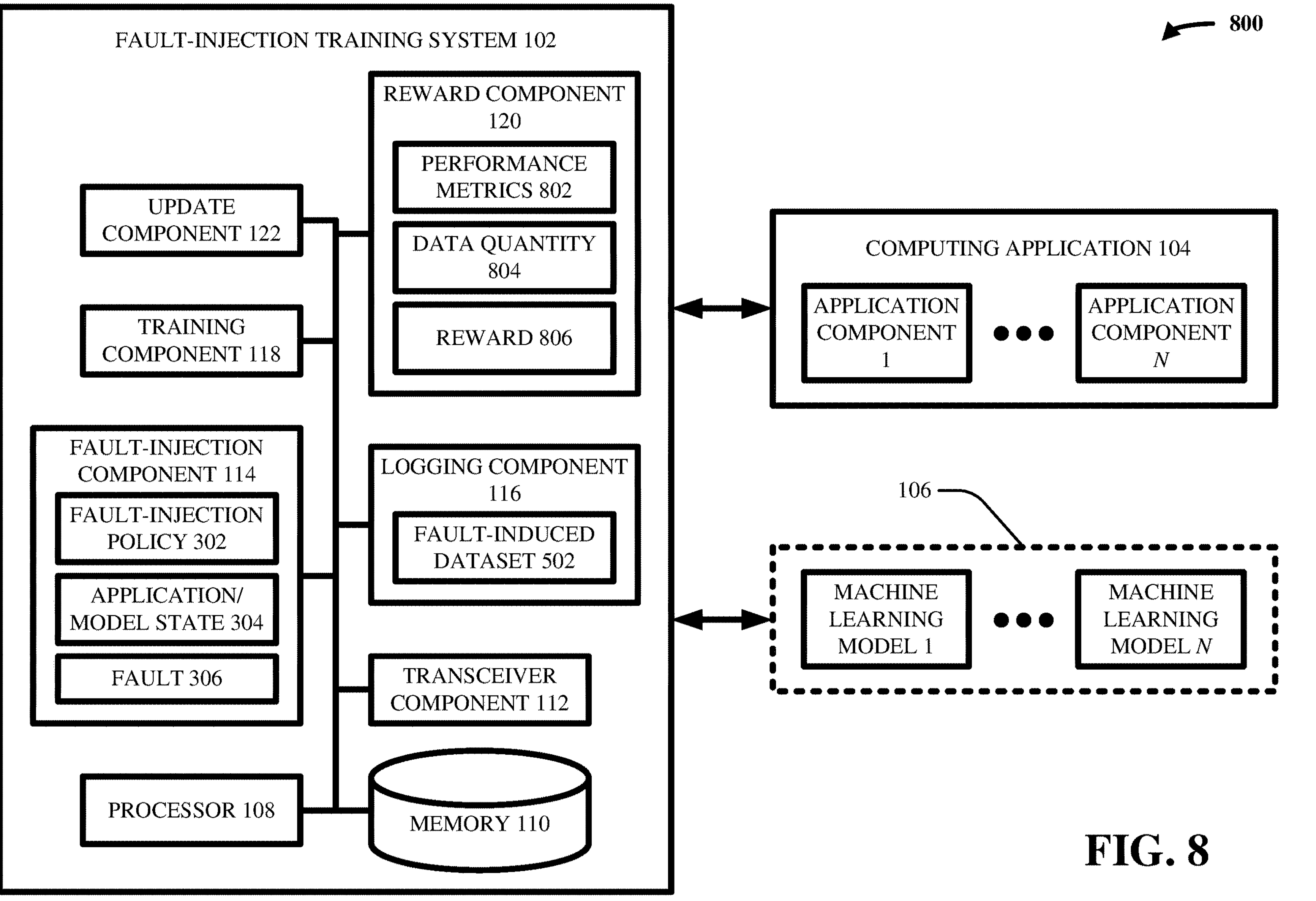
FIG. 8 illustrates a block diagram of an example, non-limiting system including a reinforcement learning reward that facilitates training data generation via reinforcement learning fault-injection in accordance with one or more embodiments described herein.

FIG. 8 illustrates a block diagram of an example, non-limiting system 800 including a reinforcement learning reward that can facilitate training data generation via reinforcement learning fault-injection in accordance with one or more embodiments described herein. As shown, the system 800 can, in some cases, comprise the same components as the system 500, and can further comprise a set of performance metrics 802, a data quantity 804, and/or a reward 806.

In various embodiments, after the training component 118 has updated the internal parameters of the set of machine learning models 106, the reward component 120 can electronically compute the set of performance metrics 802 based on the set of machine learning models 106. More specifically, the transceiver component 112 can electronically receive, retrieve, and/or otherwise access m validation datasets (not shown): a validation dataset 1 to a validation dataset m. In various aspects, the reward component 120 can respectively execute the set of machine learning models 106 on the m validation datasets, and the reward component 120 can compute the set of performance metrics 802 based on such executions. For example, the reward component 120 can execute the machine learning model 1 on the validation dataset 1, and the reward component 120 can calculate an accuracy level, a precision level, and/or a recall level of the machine learning model 1 based on such execution. Likewise, the reward component 120 can execute the machine learning model m on the validation dataset m, and the reward component 120 can calculate an accuracy level, a precision level, and/or a recall level of the machine learning model m based on such execution. Accordingly, such resulting accuracy levels, precision levels, and/or recall levels can collectively be considered as the set of performance metrics 802. Those having ordinary skill in the art will appreciate that any suitable performance metrics other than accuracy, precision, and/or recall can be implemented in various embodiments (e.g., F1 score, area-under-curve).

Furthermore, in various aspects, the reward component 120 can electronically compute the data quantity 804 based on the fault-induced dataset 502. More specifically, the data quantity 804 can be considered as representing a size of the fault-induced dataset 502. In various instances, the data quantity 804 can be measured in any suitable units. As an example, the data quantity 804 can be measured in bytes. As another example, the data quantity 804 can be measured in lines of code. As still another example, the data quantity 804 can be measured in character count.

In various aspects, once the reward component 120 has generated the set of performance metrics 802 and the data quantity 804, the reward component 120 can electronically compute the reward 806 based on the set of performance metrics 802 and/or the data quantity 804. More specifically, the reward 806 can be a scalar whose magnitude is equal to and/or otherwise based on any suitable combination of any suitable mathematical functions (e.g., logarithmic function, exponential function, polynomial function, linear combination function, multiplicative scaling function) that take as arguments the set of performance metrics 802 and/or that take as an argument the data quantity 804. In various instances, as those having ordinary skill in the art will appreciate, the reward 806 can be mathematically defined such that the magnitude of the reward 806 increases as the magnitudes of the set of performance metrics 802 increase and/or as the magnitude of the data quantity 804 increases, and/or such that the magnitude of the reward 806 decreases as the magnitudes of the set of performance metrics 802 decrease and/or as the magnitude of the data quantity 804 decreases.

Figure 9:
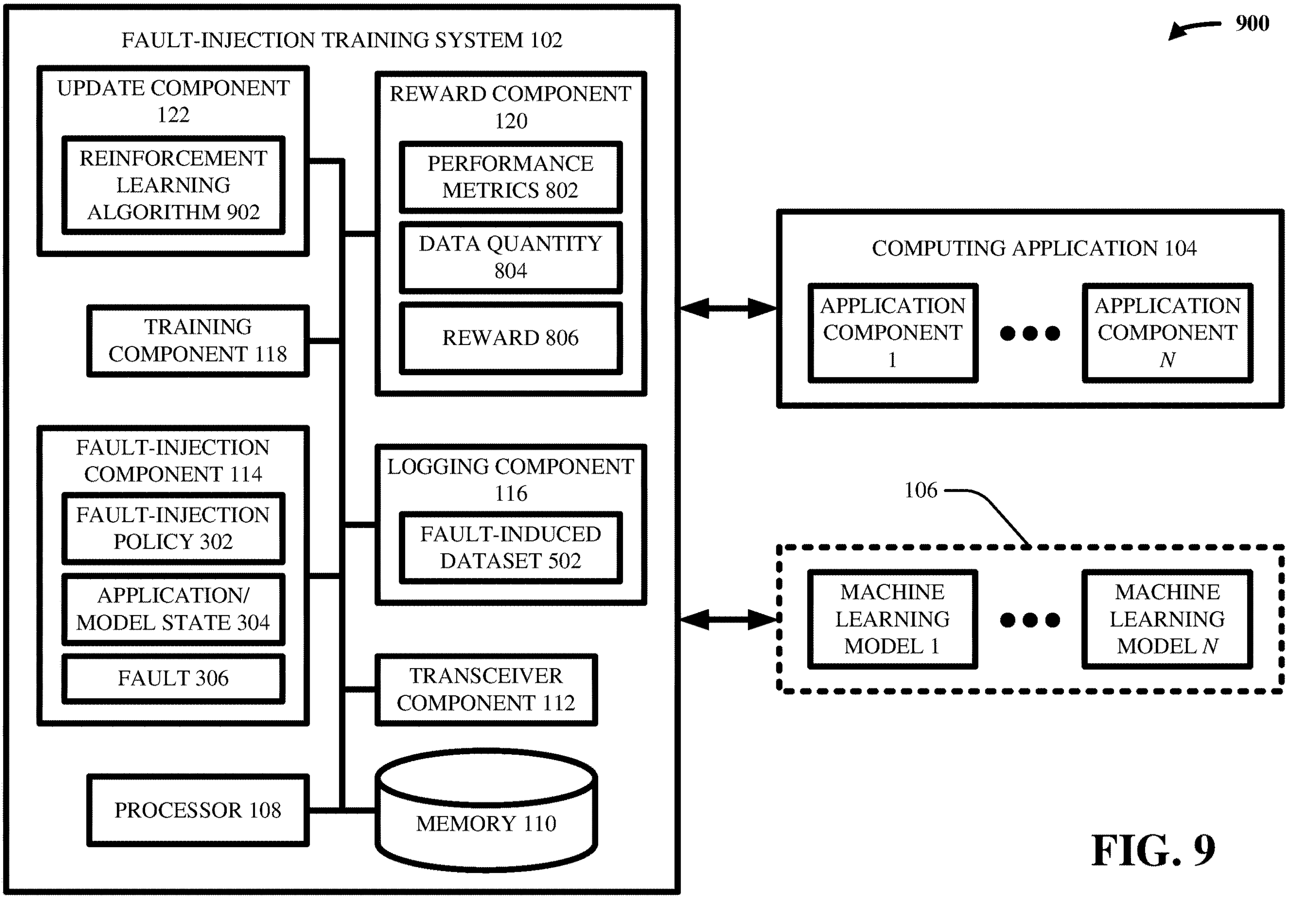
FIG. 9 illustrates a block diagram of an example, non-limiting system including a reinforcement learning algorithm that facilitates training data generation via reinforcement learning fault-injection in accordance with one or more embodiments described herein.

FIG. 9 illustrates a block diagram of an example, non-limiting system 900 including a reinforcement learning algorithm that can facilitate training data generation via reinforcement learning fault-injection in accordance with one or more embodiments described herein. As shown, the system 900 can, in some cases, comprise the same components as the system 800, and can further comprise a reinforcement learning algorithm 902.

In various embodiments, the update component 122 can electronically store, electronically maintain, and/or otherwise electronically access the reinforcement learning algorithm 902. In various aspects, the reinforcement learning algorithm 902 can be any suitable reinforcement learning technique that can, upon execution, update a reinforcement learning policy based on a reinforcement learning reward. As an example, the reinforcement learning algorithm 902 can be dynamic programming. As another example, the reinforcement learning algorithm 902 can be Q-learning. As still another example, the reinforcement learning algorithm 902 can be deep Q-learning. As yet another example, the reinforcement learning algorithm 902 can be proximal policy optimization.

In any case, the update component 122 can electronically execute the reinforcement learning algorithm 902 on the fault-injection policy 302. In various aspects, such execution of the reinforcement learning algorithm 902 can cause the fault-injection policy 302 to be updated, changed, and/or otherwise modified, where such update, change, and/or modification is based on the magnitude of the reward 806. In other words, execution of the reinforcement learning algorithm 902 can change the mapping between the set of application/model states 402 and the set of injectable faults 404 that is provided by the fault-injection policy 302. As those having ordinary skill in the art will appreciate, the effect and/or purpose of such update, change, and/or modification can be to increase the average expected value of the reward 806 over subsequent iterations.

In various aspects, once the update component 122 has updated the fault-injection policy 302, various of the above-described procedures can be repeated. For instance, the fault-injection component 114 can identify a new fault based on the updated version of the fault-injection policy 302 and based on a new current application/model state; the fault-injection component 114 can inject the new fault into the computing application 104; the logging component 116 can record a new fault-induced dataset that is outputted by the computing application 104 in response to the new fault; the training component 118 can update the set of machine learning models 106 based on the new fault-induced dataset and the new fault; the reward component 120 can compute a new reward based on a new set of performance metrics of the set of machine learning models 106 and based on a quantity of the new resultant dataset; and the update component 122 can execute the reinforcement learning algorithm 902, so as to again update the fault-injection policy 302 based on the new reward. In various cases, this can be repeated for any suitable number of iterations. More specifically, at each iteration, the update component 122 can determine whether the reward 806 satisfies any suitable threshold value, and a subsequent iteration can be commenced unless the reward 806 satisfies the threshold value.

In other words, and as mentioned above, the inventors of various embodiments described herein created a reinforcement learning framework, in which the reinforcement learning states include any suitable information pertaining to the computing application 104 and/or to the set of machine learning models 106, in which the reinforcement learning actions are injections of faults into the computing application 104, and in which the reinforcement learning reward is computed based on the performance metrics of the set of machine learning models 106 and based on the size of the data that is outputted by the computing application 104 in response to injection of a fault.

Although not shown in the figures, various embodiments described herein can include active learning, in which subject matter experts (e.g., human and/or otherwise) manually select a next fault to inject into the computing application 104.

Figure 10:
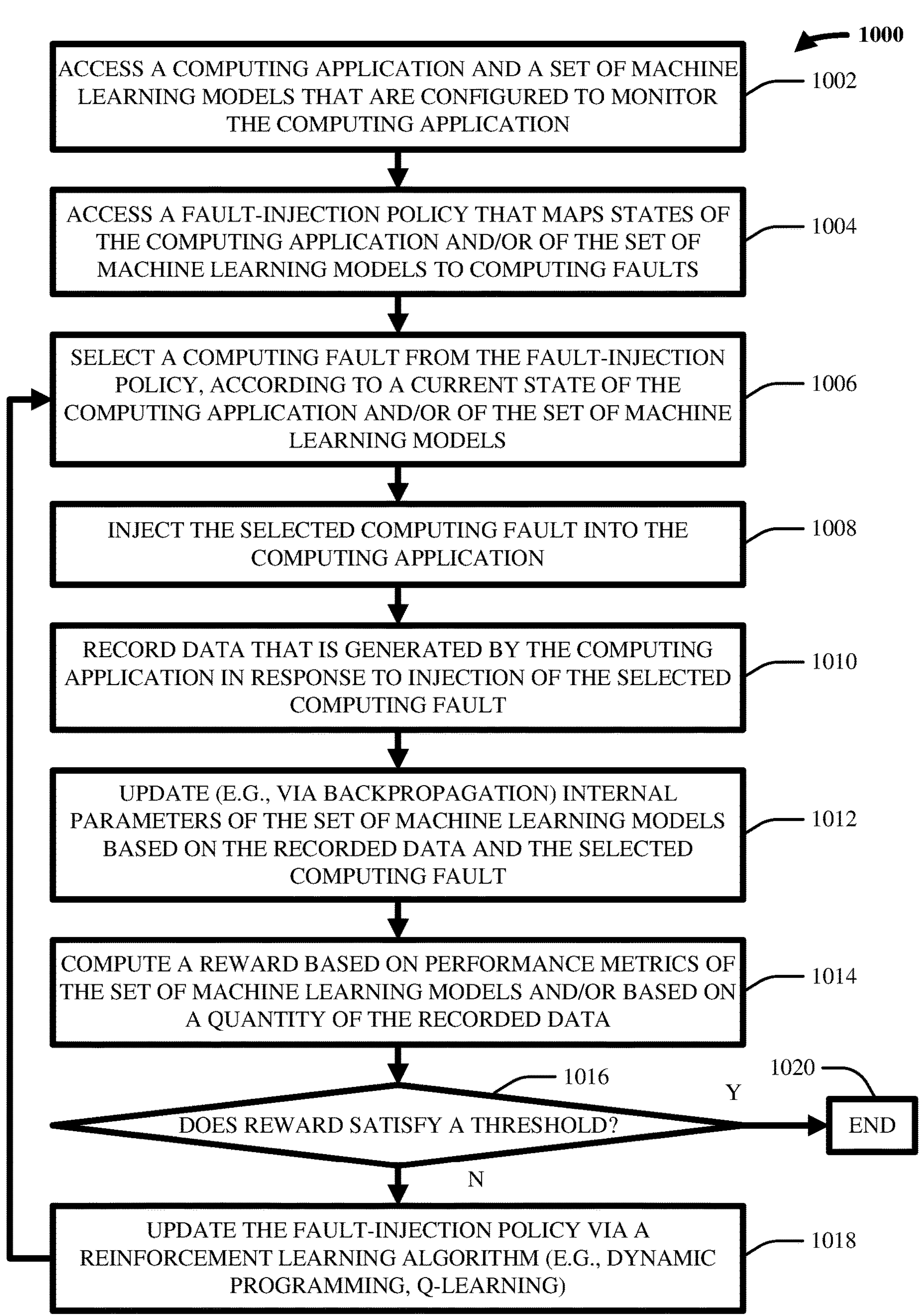
FIG. 10 illustrates a flow diagram of an example, non-limiting computer-implemented method that facilitates training data generation via reinforcement learning fault-injection in accordance with one or more embodiments described herein.

FIG. 10 illustrates a flow diagram of an example, non-limiting computer-implemented method 1000 that can facilitate training data generation via reinforcement learning fault-injection in accordance with one or more embodiments described herein. In various cases, the fault-injection training system 102 can facilitate the computer-implemented method 1000.

In various embodiments, act 1002 can include accessing, by a device (e.g., via 112) operatively coupled to a processor, a computing application (e.g., 104) and a set of machine learning models (e.g., 106) that are configured to monitor the computing application.

In various aspects, act 1004 can include accessing, by the device (e.g., via 114), a fault-injection policy (e.g., 302) that maps states (e.g., 402) of the computing application and/or of the set of machine learning models to computing faults (e.g., 404).

In various instances, act 1006 can include selecting, by the device (e.g., via 114), a computing fault (e.g., 306) from the fault-injection policy, according to a current state (e.g., 304) of the computing application and/or of the set of machine learning models.

In various cases, act 1008 can include injecting, by the device (e.g., via 114), the selected computing fault into the computing application.

In various aspects, act 1010 can include recording, by the device (e.g., via 116), data (e.g., 502) that is generated by the computing application in response to injection of the selected computing fault.

In various instances, act 1012 can include updating, by the device (e.g., via 118), internal parameters of the set of machine learning models based on the recorded data and the selected computing fault.

In various cases, act 1014 can include computing, by the device (e.g., via 120), a reward (e.g., 806) based on performance metrics (e.g., 802) of the set of machine learning models and/or based on a quantity (e.g., 804) of the recorded data.

In various aspects, act 1016 can include determining, by the device (e.g., via 122), whether the reward satisfies a threshold. If so, the computer-implemented method 1000 can proceed to act 1020, where it ends. If not, the computer-implemented method 1000 can proceed to act 1018.

In various instances, act 1018 can include updating, by the device (e.g., via 122), the fault-injection policy via a reinforcement learning algorithm (e.g., 902). In various cases, the computer-implemented method 1000 can proceed back to act 1006. Accordingly, acts 1006-1018 can iterate until the computed reward satisfies the threshold.

Figure 11:
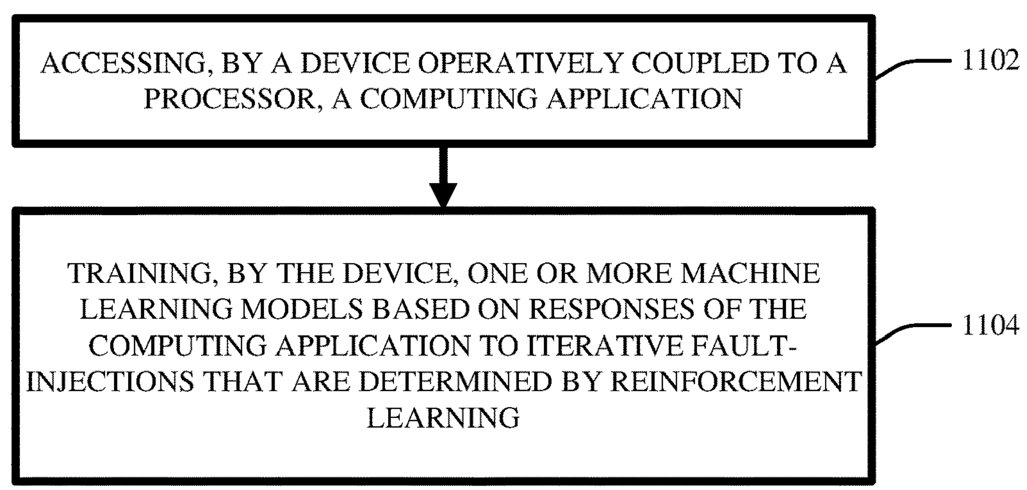
FIG. 11 illustrates a flow diagram of an example, non-limiting computer-implemented method that facilitates training data generation via reinforcement learning fault-injection in accordance with one or more embodiments described herein.

FIG. 11 illustrates a flow diagram of an example, non-limiting computer-implemented method 1100 that can facilitate training data generation via reinforcement learning fault-injection in accordance with one or more embodiments described herein. In various cases, the fault-injection training system 102 can facilitate the computer-implemented method 1100.

In various embodiments, act 1102 can include accessing, by a device (e.g., via 112) operatively coupled to a processor, a computing application (e.g., 104).

In various aspects, act 1104 can include training, by the device (e.g., via 118), one or more machine learning models (e.g., 106) based on responses (e.g., 502) of the computing application to iterative fault-injections that are determined by reinforcement learning (e.g., 302, 806, and/or 902).

Although not explicitly shown in FIG. 11, the training the one or more machine learning models based on responses of the computing application to iterative fault-injections can include: injecting, by the device (e.g., via 114), a first fault (e.g., 306) into the computing application, based on a fault-injection policy (e.g., 302); recording, by the device (e.g., 116), a resultant dataset (e.g., 502) outputted by the computing application in response to the first fault; training, by the device (e.g., via 118), the one or more machine learning models on the resultant dataset and the first fault; evaluating, by the device (e.g., via 120), one or more performance metrics (e.g., 802) of the one or more machine learning models after training; evaluating, by the device (e.g., via 120), a quantity (e.g., 804) of the resultant dataset; computing, by the device (e.g., via 120), a reinforcement learning reward (e.g., 806) based on the one or more performance metrics and the quantity; updating, by the device (e.g., via 122) and via execution of a reinforcement learning algorithm (e.g., 902), the fault-injection policy based on the reinforcement learning reward; and injecting, by the device (e.g., 114), a second fault into the computing application, based on the updated fault-injection policy.

Various embodiments described herein include a computerized tool that can train one or more machine learning models on error data, where such error data is outputted by a computing application in response to iterative injection of computing faults, and where such computing faults are determined according to a reinforcement learning algorithm. Such a computerized tool can help to ensure that the one or more machine learning models are sufficiently trained, even in the absence of historical training data associated with the computing application. Thus, such a computerized tool is certainly a useful and practical application of computers.

In various instances, machine learning algorithms and/or models can be implemented in any suitable way to facilitate any suitable aspects described herein. To facilitate some of the above-described machine learning aspects of various embodiments of the subject innovation, consider the following discussion of artificial intelligence (AI). Various embodiments of the present innovation herein can employ artificial intelligence to facilitate automating one or more features of the present innovation. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) of the present innovation, components of the present innovation can examine the entirety or a subset of the data to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z_1, z_2, z_3, z_4, z_n)$, to a confidence that the input belongs to a class, as by f(z)=confidence(class). Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

Those having ordinary skill in the art will appreciate that the herein disclosure describes non-limiting examples of various embodiments of the invention. For ease of description and/or explanation, various portions of the herein disclosure utilize the term "each" when discussing various embodiments of the invention. Those having ordinary skill in the art will appreciate that such usages of the term "each" are non-limiting examples. In other words, when the herein disclosure provides a description that is applied to "each" of some particular computerized object and/or component, it should be understood that this is a non-limiting example of various embodiments of the invention, and it should be further understood that, in various other embodiments of the invention, it can be the case that such description applies to fewer than "each" of that particular computerized object.

Those having ordinary skill in the art will appreciate that the herein disclosure describes non-limiting examples of various embodiments of the subject innovation. For ease of description and/or explanation, various portions of the herein disclosure utilize the term "each" when discussing various embodiments of the subject innovation. Those having ordinary skill in the art will appreciate that such usages of the term "each" are non-limiting examples. In other words, when the herein disclosure provides a description that is applied to "each" of some particular computerized object and/or component, it should be understood that this is a non-limiting example of various embodiments of the subject innovation, and it should be further understood that, in various other embodiments of the subject innovation, it can be the case that such description applies to fewer than "each" of that particular computerized object.

Figure 12:
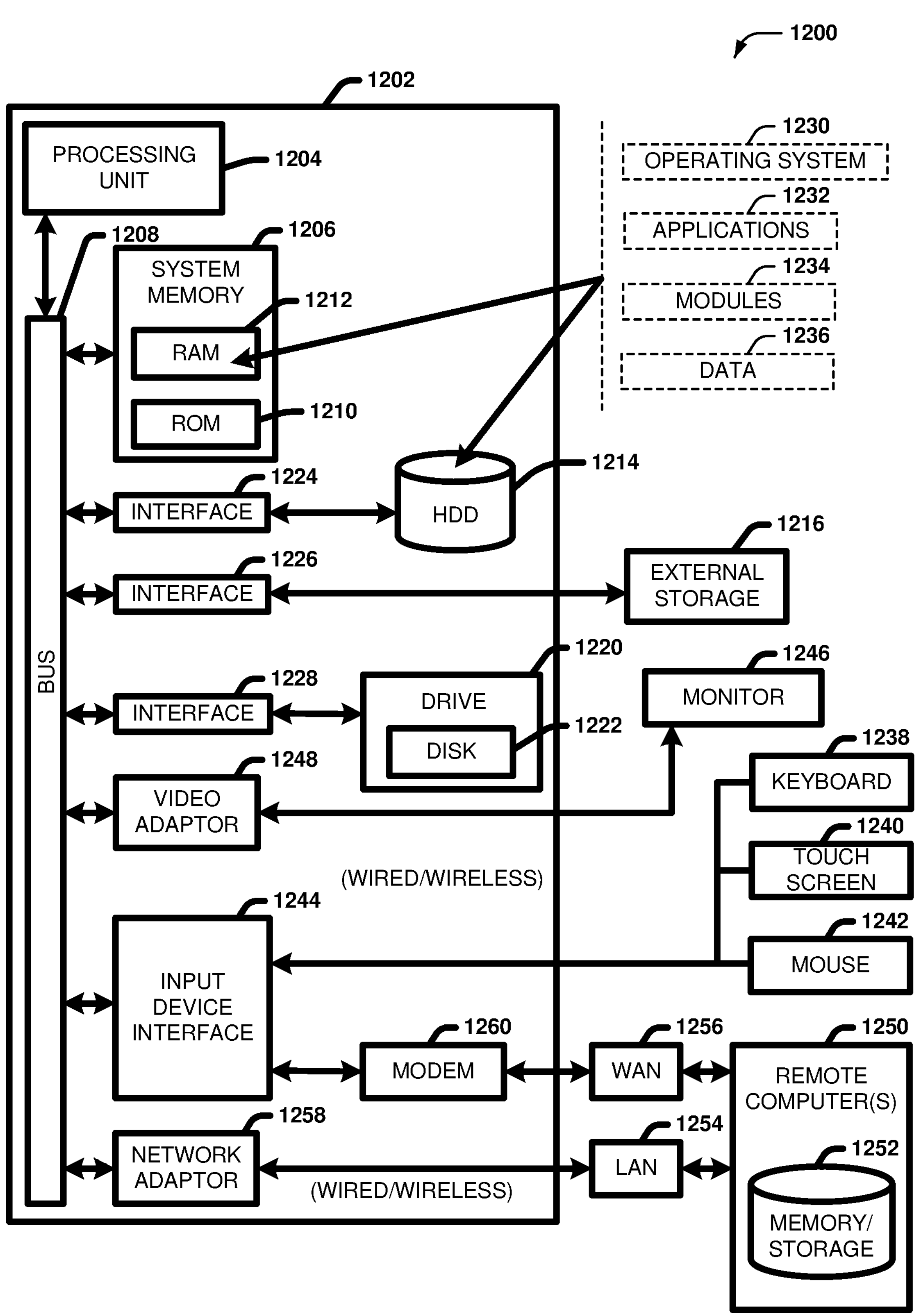
FIG. 12 illustrates a block diagram of an example, non-limiting operating environment in which one or more embodiments described herein can be facilitated.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and a drive 1220, e.g., such as a solid state drive, an optical disk drive, which can read or write from a disk 1222, such as a CD-ROM disc, a DVD, a BD, etc. Alternatively, where a solid state drive is involved, disk 1222 would not be included, unless separate. While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and drive 1220 can be connected to the system bus 1208 by an HDD interface 1224, an external storage interface 1226 and a drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above, such as but not limited to a network virtual machine providing one or more aspects of storage or processing of information. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 13:
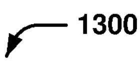
FIG. 13 illustrates an example, non-limiting cloud computing environment in accordance with one or more embodiments described herein.
Figure 13:
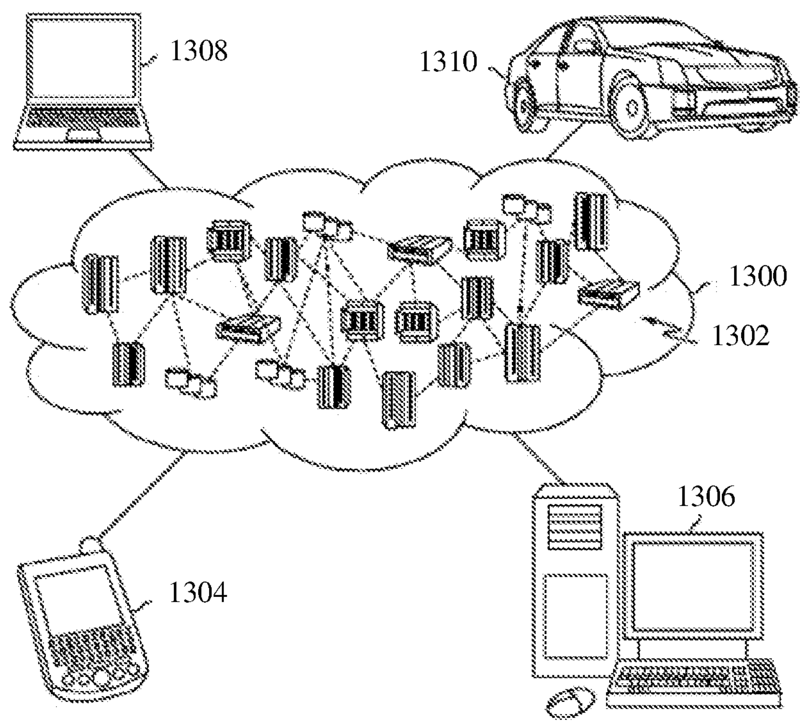

Referring now to FIG. 13, illustrative cloud computing environment 1300 is depicted. As shown, cloud computing environment 1300 includes one or more cloud computing nodes 1302 with which local computing devices used by cloud consumers, such as, for example, personal digital assistant (PDA) or cellular telephone 1304, desktop computer 1306, laptop computer 1308, and/or automobile computer system 1310 may communicate. Nodes 1302 may communicate with one another. They may be grouped (not shown) physically or virtually, in one or more networks, such as Private, Community, Public, or Hybrid clouds as described hereinabove, or a combination thereof. This allows cloud computing environment 1300 to offer infrastructure, platforms and/or software as services for which a cloud consumer does not need to maintain resources on a local computing device. It is understood that the types of computing devices 1304-1310 shown in FIG. 13 are intended to be illustrative only and that computing nodes 1302 and cloud computing environment 1300 can communicate with any type of computerized device over any type of network and/or network addressable connection (e.g., using a web browser).

Figure 14:
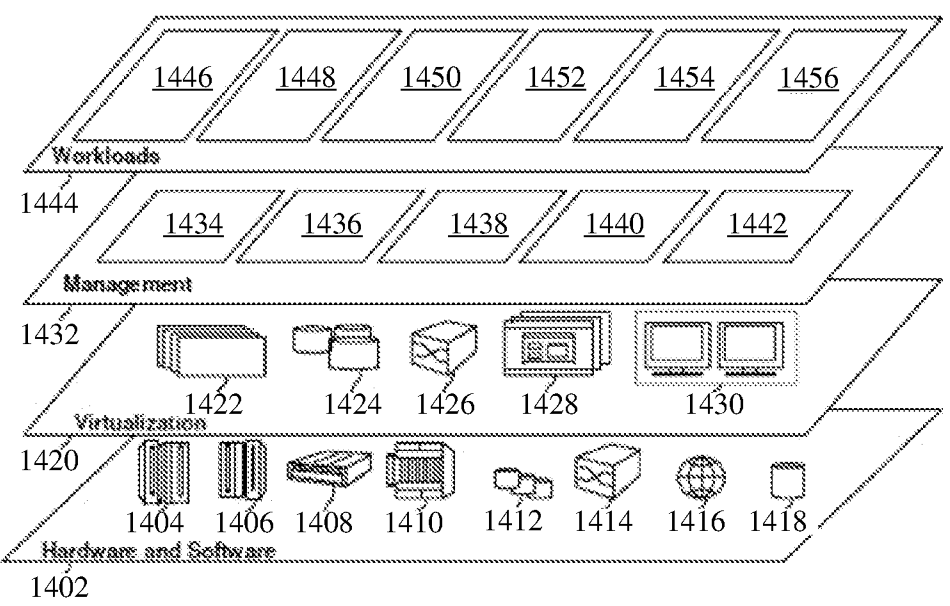
FIG. 14 illustrates example, non-limiting abstraction model layers in accordance with one or more embodiments described herein.

Referring now to FIG. 14, a set of functional abstraction layers provided by cloud computing environment 1300 (FIG. 13) is shown. Repetitive description of like elements employed in other embodiments described herein is omitted for sake of brevity. It should be understood in advance that the components, layers, and functions shown in FIG. 14 are intended to be illustrative only and embodiments of the invention are not limited thereto. As depicted, the following layers and corresponding functions are provided.

Hardware and software layer 1402 includes hardware and software components. Examples of hardware components include: mainframes 1404; RISC (Reduced Instruction Set Computer) architecture based servers 1406; servers 1408; blade servers 1410; storage devices 1412; and networks and networking components 1414. In some embodiments, software components include network application server software 1416 and database software 1418.

Virtualization layer 1420 provides an abstraction layer from which the following examples of virtual entities may be provided: virtual servers 1422; virtual storage 1424; virtual networks 1426, including virtual private networks; virtual applications and operating systems 1428; and virtual clients 1430.

In one example, management layer 1432 may provide the functions described below. Resource provisioning 1434 provides dynamic procurement of computing resources and other resources that are utilized to perform tasks within the cloud computing environment. Metering and Pricing 1436 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1438 provides access to the cloud computing environment for consumers and system administrators. Service level management 1440 provides cloud computing resource allocation and management such that required service levels are met. Service Level Agreement (SLA) planning and fulfillment 1442 provide pre-arrangement for, and procurement of, cloud computing resources for which a future requirement is anticipated in accordance with an SLA.

Workloads layer 1444 provides examples of functionality for which the cloud computing environment may be utilized. Examples of workloads and functions which may be provided from this layer include: mapping and navigation 1446; software development and lifecycle management 1448; virtual classroom education delivery 1450; data analytics processing 1452; transaction processing 1454; and differentially private federated learning processing 1456. Various embodiments of the present invention can utilize the cloud computing environment described with reference to FIGS. 13 and 14 to execute one or more differentially private federated learning process in accordance with various embodiments described herein.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adaptor card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, and/or data structures, that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms “includes,” “has,” “possesses,” and the like are used in the detailed description, claims, appendices and drawings such terms are intended to be inclusive in a manner similar to the term “comprising” as “comprising” is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:

a processor that executes computer-executable components stored in a computer-readable memory, the computer-executable components comprising:

a transceiver component that accesses a computing application;

a training component that trains one or more machine learning models based on responses of the computing application to iterative fault-injections that are determined via reinforcement learning, wherein at least one of the fault-injections comprises an error, and wherein a size of error data and performance quality of the one or more machine learning models after being trained on the error data collectively dictate a reward of the reinforcement learning;

a reward component that computes a reinforcement learning reward based on one or more performance metrics of the one or more machine learning models after the training; and an update component that updates, via execution of a reinforcement learning algorithm and employing backpropagation, the fault-injection policy based on the reinforcement learning reward.

2. The system of claim 1, wherein the computer-executable components further comprise:

a fault-injection component that injects a first fault into the computing application, based on a fault-injection policy.

3. The system of claim 2, wherein the computer-executable components further comprise:

a logging component that records a resultant dataset outputted by the computing application in response to the first fault.

4. The system of claim 3, wherein the training component trains the one or more machine learning models on the resultant dataset and the first fault.

5. The system of claim 4, wherein the computer-executable:

a reward component also computes a quantity of the resultant dataset.

6. The system of claim 1, wherein the fault-injection component injects a second fault into the computing application, based on the updated fault-injection policy.

7. A computer-implemented method, comprising:

accessing, by a device operatively coupled to a processor, a computing application;

training, by the device, one or more machine learning models based on responses of the computing application to iterative fault-injections that are determined via reinforcement learning, wherein at least one of the fault-injections comprises an error, and wherein concurrent consideration of a size of error data and a performance quality of the one or more machine learning models after being trained on the error data dictate a reward of the reinforcement learning;

computing, by the device, a reinforcement learning reward based on one or more performance metrics of the one or more machine learning models after the training; and updating, by the device, via execution of a reinforcement learning algorithm and employing backpropagation, the fault-injection policy based on the reinforcement learning reward.

8. The computer-implemented method of claim 7, wherein the training the one or more machine learning models based on responses of the computing application to iterative fault-injections includes:

injecting, by the device, a first fault into the computing application, based on a fault-injection policy.

9. The computer-implemented method of claim 8, wherein the training the one or more machine learning models based on responses of the computing application to iterative fault-injections further includes:

recording, by the device, a resultant dataset outputted by the computing application in response to the first fault.

10. The computer-implemented method of claim 9, wherein the training the one or more machine learning models based on responses of the computing application to iterative fault-injections further includes:

training, by the device, the one or more machine learning models on the resultant dataset and the first fault.

11. The computer-implemented method of claim 10, wherein the training the one or more machine learning models based on responses of the computing application to iterative fault-injections further includes:

computing, by the device, a quantity of the resultant dataset.

12. The computer-implemented method of claim 11, wherein the training the one or more machine learning models based on responses of the computing application to iterative fault-injections further includes:

updating, by the device and via execution of a reinforcement learning algorithm, the fault-injection policy based on the reinforcement learning reward.

13. The computer-implemented method of claim 12, wherein the training the one or more machine learning models based on responses of the computing application to iterative fault-injections further includes:

injecting, by the device, a second fault into the computing application, based on the updated fault-injection policy.

14. A computer program product for facilitating training data generation via reinforcement learning fault-injection, the computer program product comprising a computer-readable memory having program instructions embodied therewith, the program instructions executable by a processor to cause the processor to:

access, by the processor, a computing application;

train, by the processor, one or more machine learning models based on responses of the computing application to iterative fault-injections that are determined via reinforcement learning wherein at least one of the fault-injections comprises an error, and wherein a size of error data and a performance quality of the one or more machine learning models after being trained on the error data collectively dictate comprises a reward of the reinforcement learning;

compute, by the processor, a reinforcement learning reward based on one or more performance metrics of the one or more machine learning models after the training; and update, by the processor, via execution of a reinforcement learning algorithm and employing backpropagation, the fault-injection policy based on the reinforcement learning reward.

15. The computer program product of claim 14, wherein the processor trains the one or more machine learning models based on responses of the computing application to iterative fault-injections by:

injecting, by the processor, a first fault into the computing application, based on a fault-injection policy.

16. The computer program product of claim 15, wherein the processor trains the one or more machine learning models based on responses of the computing application to iterative fault-injections by:

recording, by the processor, a resultant dataset outputted by the computing application in response to the first fault.

17. The computer program product of claim 16, wherein the processor trains the one or more machine learning models based on responses of the computing application to iterative fault-injections by:

training, by the processor, the one or more machine learning models on the resultant dataset and the first fault.

18. The computer program product of claim 17, wherein the processor trains the one or more machine learning models based on responses of the computing application to iterative fault-injections by:

computing, by the processor, a quantity of the resultant dataset.

19. The computer program product of claim 18, wherein the processor trains the one or more machine learning models based on responses of the computing application to iterative fault-injections by:

updating, by the processor and via execution of a reinforcement learning algorithm, the fault-injection policy based on the reinforcement learning reward.

* * * * *